US009573681B2

(12) United States Patent
Smith

(10) Patent No.: US 9,573,681 B2
(45) Date of Patent: Feb. 21, 2017

(54) WING-DRIVE MECHANISM WITH UNIDIRECTIONAL DRIVE

(71) Applicant: Michael J. C. Smith, Forsyth, IL (US)

(72) Inventor: Michael J. C. Smith, Forsyth, IL (US)

( * ) Notice: Subject to any disclaimer, the term of this patent is extended or adjusted under 35 U.S.C. 154(b) by 123 days.

(21) Appl. No.: 14/180,465

(22) Filed: Feb. 14, 2014

(65) Prior Publication Data

US 2015/0232179 A1    Aug. 20, 2015

(51) Int. Cl.
*B64C 33/02*    (2006.01)

(52) U.S. Cl.
CPC ..................... *B64C 33/02* (2013.01)

(58) Field of Classification Search
CPC ........ B64C 33/00; B64C 33/02; B64C 33/025; B64C 39/028
See application file for complete search history.

(56) References Cited

U.S. PATENT DOCUMENTS

| | | | |
|---|---|---|---|
| 6,206,324 B1 * | 3/2001 | Smith | B64C 33/02 244/72 |
| 6,565,039 B2 * | 5/2003 | Smith | B64C 33/025 244/72 |
| 6,568,634 B2 * | 5/2003 | Smith | B64C 33/02 244/22 |
| 6,783,097 B1 * | 8/2004 | Smith | B64C 33/02 244/11 |
| 8,181,907 B2 * | 5/2012 | Smith | B64C 33/02 244/11 |
| 2014/0158821 A1 * | 6/2014 | Keennon | B64C 33/02 244/72 |

* cited by examiner

*Primary Examiner* — Richard G Davis
(74) *Attorney, Agent, or Firm* — Gary C Cohn PLLC

(57) ABSTRACT

A wing-drive mechanism includes at least one sub-mechanism having a motor that drives a drive shaft in a single direction. The sub-mechanism includes a converter means for converting the rotary motion of the drive shaft to a linear or arcuate back-and-forth motion; amplitude control means for controllably varying the extent of the linear or arcuate back-and-forth motion produced by the converter means; and a rotatably mounted output mechanism engaged with the converter means such that when the converter means produces the linear or arcuate back-and-forth motion, a corresponding alternating rotary motion is imparted to the output mechanism. In other embodiments, the invention is also a wing-drive mechanism and a method for configuring pairs of wing-drive mechanisms.

20 Claims, 19 Drawing Sheets

WING-DRIVE MECHANISM WITH UNIDIRECTIONAL DRIVE

This invention relates to drive mechanisms for vehicles that derive motion from one or more flapping wings.

In U.S. Pat. Nos. 6,206,324, 6,565,039, 6,568,634, 6,783,097, and 8,181,907, various designs for a wing-drive mechanism are described. These wing-drive mechanisms include sub-mechanisms including a flap-drive mechanism, a pitch-drive mechanism and a yaw-drive mechanism. Each of which the sub-mechanisms operates independently to provide, within their respective ranges of motion, the ability to achieve any arbitrary combination flap, pitch and yaw movement to the wing. Through proper computerized control of the sub-mechanisms, the wing-drive mechanism is capable, for example, of powering an ornithopter in various complicated flight modes including movement in any arbitrary direction as well as hovering.

Further improvements to this wing-drive mechanism would be beneficial. One potential concern is that the wing-drive mechanism described in the above-mentioned patents requires oscillating motors in each of the flap, yaw and pitch sub-mechanisms. In order to provide a flap motion, for example, the corresponding motor must be able to reverse direction each time the wing reaches an end point of its flapping movement. This can be done positively (by having the motor provide an alternating motive force in both directions) or passively (by having the motor provide intermittent motive force in a single direction, with the opposing force being supplied by, for example, a spring mechanism or a similar device). In either case, the constant reversal of motor direction, or constant stopping and restarting, can cause several problems such as excessive wear; excessive energy consumption, and the development of waste heat (which can cause localized overheating). These problems may be very significant for each of the motors, which typically operate at high frequency. It would be very beneficial to use unidirectional motors, i.e., motors that move in only one direction yet impart the desired oscillating motion to the wing.

A second desire would be to provide independent control of amplitude and frequency in the sub-mechanisms. In the wing-drive mechanisms described in the above-mentioned patents, the frequency and amplitude are coupled and cannot be independently controlled.

A third desire has to do with miniaturization of the wing-drive mechanism, in terms of its volume and preferably also of its weight. A more compact wing-drive mechanism can occupy a smaller portion of the vehicle, leaving more space for carrying more payload or equipment or, alternatively, reducing the size and weight of the vehicle.

This invention provides, in some aspects, a drive mechanism that imparts oscillating motion to an output spar while providing independent control of frequency and amplitude. The wing-drive mechanism comprises independently operably flap, yaw and pitch sub-mechanisms, in which at least one of the sub-mechanisms includes:

a) a drive shaft rotatable in a single direction and b) a conversion unit for producing an alternating rotary motion, wherein the conversion unit includes:

b-1) converter means for converting the rotary motion of the drive shaft to a linear or arcuate back-and-forth motion;

b-2) a rotatably mounted output mechanism engaged with the converter means such that when the converter means produces the linear or arcuate back-and-forth motion, a corresponding alternating rotary motion is imparted to the output mechanism and b-3) torsion control means engaged with the output mechanism.

In preferred embodiments, the conversion unit further comprises b-4) amplitude control means for controllably varying the extent of the linear or arcuate back-and-forth motion produced by the converter means.

Any or all of the sub-mechanisms may have features a) and b) as just described, including the flap-drive sub-mechanism, the yaw-drive sub-mechanism and pitch-drive mechanism, as well as any two thereof or all three thereof.

The wing-drive mechanism of the invention is useful for propelling vehicles of any feasible size, including, for example, ornithopters.

The invention in a second aspect is a wing-drive mechanism comprising a) an outwardly extending spar that is moveable independently in flap, yaw and pitch directions about a pivot point;

b) an inwardly extending spar coupled to the outwardly extending spar through a universal joint;

c) a flap-drive sub-mechanism engaged with said outwardly extending spar for moving said outwardly extending spar in a flap direction;

d) a yaw-drive sub-mechanism engaged with said outwardly extending spar for moving said outwardly extending spar in a yaw direction;

e) a pitch-drive sub-mechanism engaged with said inwardly extending spar for moving said inwardly extending spar and said outwardly extending spar in a pitch direction;

wherein said flap, yaw and pitch-drive sub-mechanisms each operate independently of the others.

In this aspect of the invention, any of the flap, yaw and pitch-drive sub-mechanisms (or any two or more of them) may have features a) and b) as described with regard to the first aspect of the invention.

The invention is also a vehicle having a fuselage and a pair of opposing first and second wing-drive mechanisms on opposing sides of said fuselage, wherein each of said opposing first and second wing-drive mechanisms includes a) an outwardly extending spar that is moveable independently in flap, yaw and pitch directions about a pivot point;

b) an inwardly extending spar that is movable independently in flap, yaw and pitch directions about the pivot point;

c) a flap-drive sub-mechanism for moving said outwardly extending spar about the pivot point in a flap direction, said flap-drive sub-mechanism including a motor shaft;

d) a yaw-drive sub-mechanism for moving said outwardly extending spar about the pivot point in a yaw direction, said yaw-drive sub-mechanism including a rotating or oscillating motor shaft and wherein said yaw-drive sub-mechanism operates independently of said flap-drive sub-mechanism;

e) a pitch-drive sub-mechanism for moving said outwardly extending spar about the pivot point in a pitch direction, wherein said pitch-drive sub-mechanism operates independently of said flap-drive and yaw-drive sub-mechanisms;

and further wherein f) the motor shaft of the flap-drive sub-mechanism of said first wing-drive mechanism and the motor shaft of the flap-drive sub-mechanism of said second wing-drive mechanism rotate or oscillate about the same flap motor axis and g) the motor shaft of the yaw-drive sub-mechanism of said first wing-drive mechanism and the motor shaft of the yaw-drive sub-mechanism of said second wing-drive mechanism rotate or oscillate about the same yaw motor axis.

In this third aspect of the invention, any one or more of the various sub-mechanisms can be a sub-mechanism having features a) and b) as described with regard to the first aspect of the invention.

WING-DRIVE MECHANISM

Figure 17:
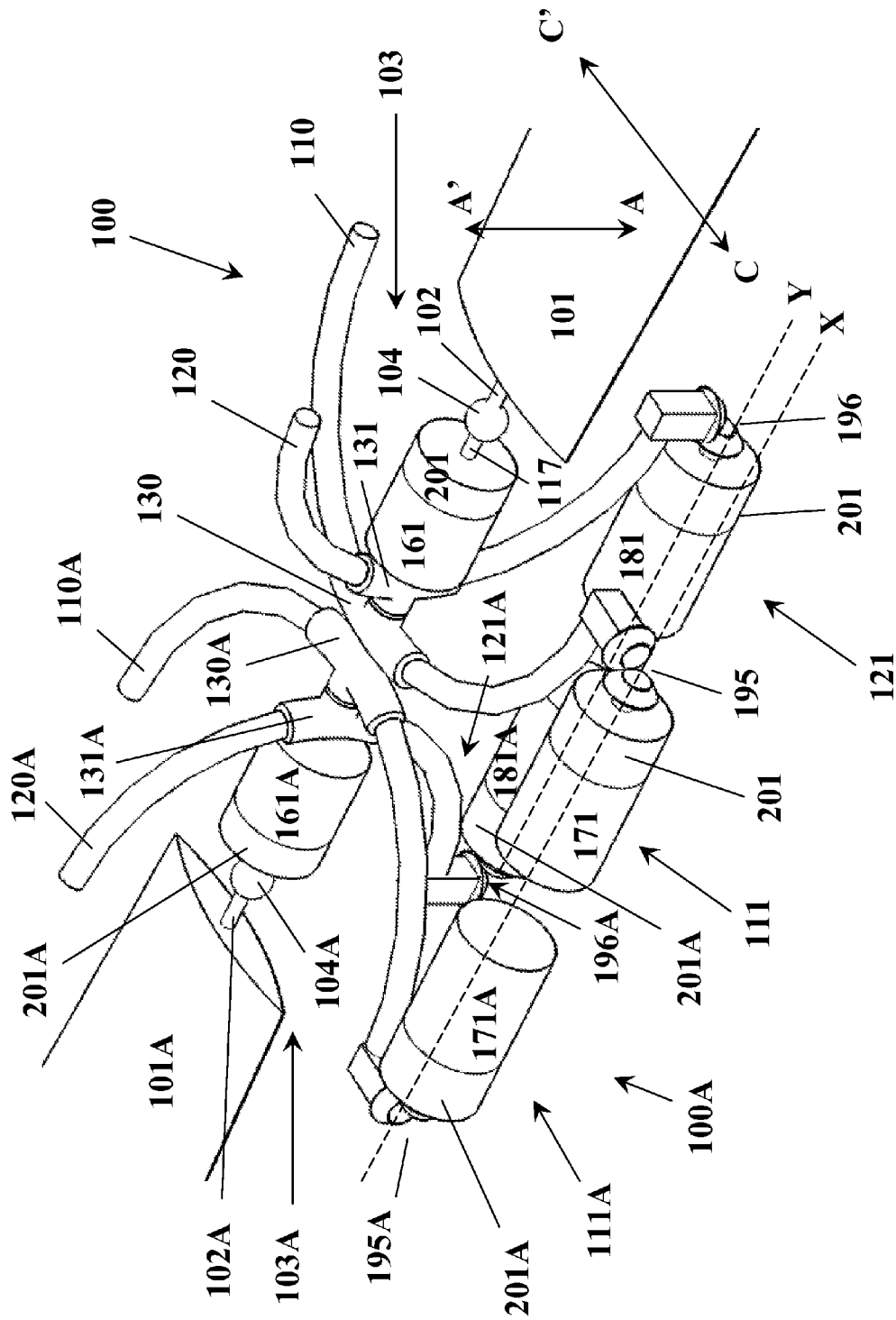
FIG. 17 is a perspective view of a first embodiment of a pair of first and second opposed wing-drive mechanisms of the invention.

Turning first to FIG. 17, there is shown an opposing pair of wing-drive mechanisms generally indicated as 100 and 100A, respectively. Each of wing-drive mechanisms 100 and 100A include a flap-drive sub-mechanism (111 and 111A, respectively), a yaw-drive sub-mechanism (121 and 121A, respectively) and a pitch-drive sub-mechanism (103 and 103A, respectively). As shown, each of the various sub-mechanisms includes a unidirectional motor (indicated as 171, 171A, 181, 181A, 161 and 161A) and a conversion unit (all of which are designated by reference numerals 201).

In the sub-mechanisms of this invention, the conversion units 201 take the unidirectional motion provided by the corresponding motors and produce an alternating rotary motion. Conversion units 201 include:

b-1) converter means for converting the rotary motion of the drive shaft to a linear or arcuate back-and-forth motion;

b-2) a rotatably mounted output mechanism engaged with the converter means such that when the converter means produces the linear or arcuate back-and-forth motion, a corresponding alternating rotary motion is imparted to the output mechanism and b-3) torsion control means engaged with the output mechanism.

Conversion units also preferably include b-4) amplitude control means for controllably varying the extent of the linear or arcuate back-and-forth motion produced by the converter means.

In some embodiments of the invention, the converter means includes a slider support rod mounted onto and perpendicular to the drive shaft such that the slider support rod rotates with the rotation of the drive shaft. A slider is mounted onto and movable along the slider support rod. The slider has an engagement rod extending perpendicularly to the slider support rod and parallel to the drive shaft. The converter means further includes a slotted reciprocator having a slot which receives the engagement rod such that when the drive shaft and slider support rod rotate, the resulting motion of the slider and the engagement rod produce a linear or arcuate back-and-forth motion of the slotted reciprocator. FIGS. 1-12 illustrate variations of such an embodiment.

Figure 1:
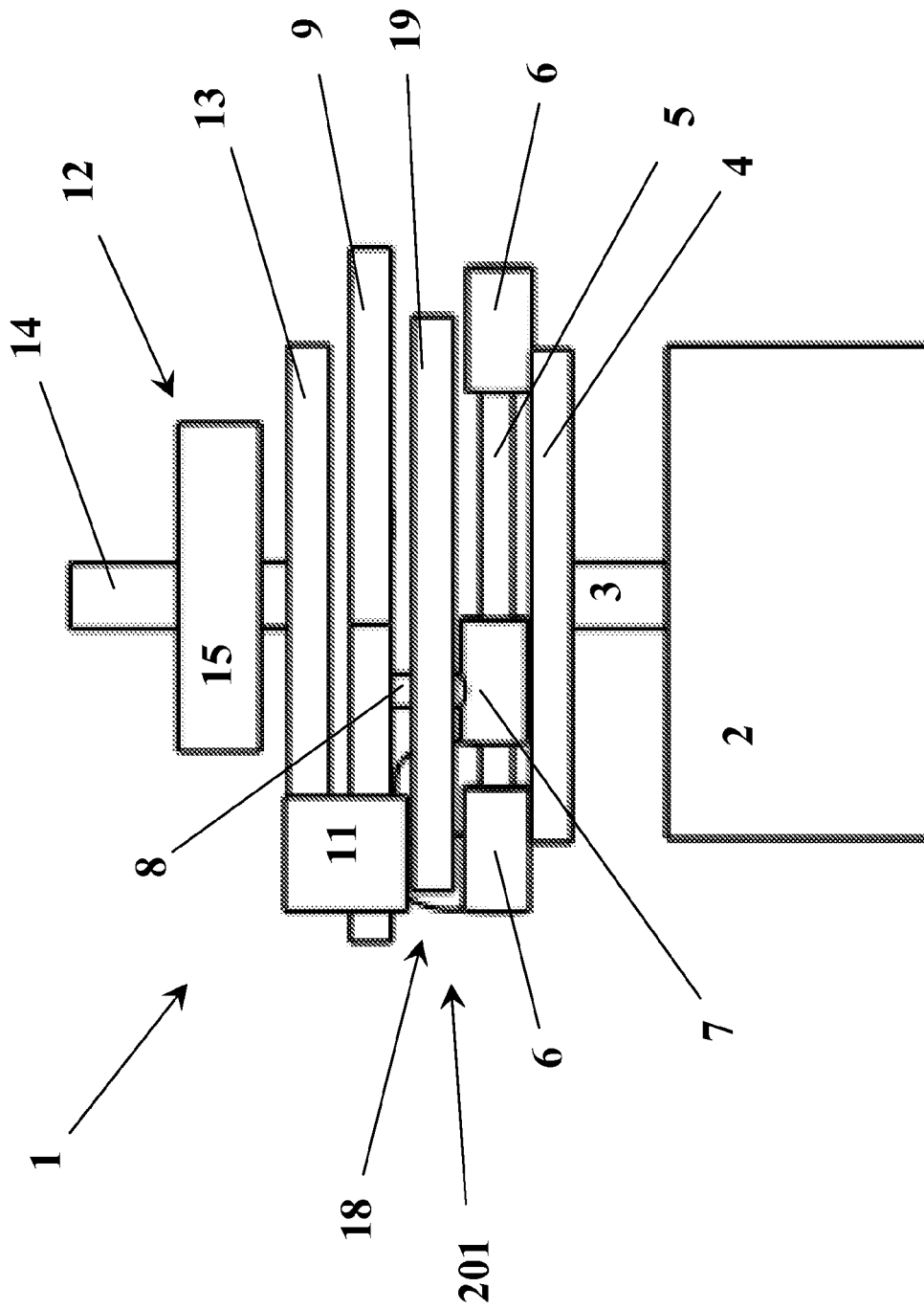
FIG. 1 is a front view of a first embodiment of a motor and conversion unit of a sub-mechanism of the wing-drive mechanism of the invention.
Figure 2:
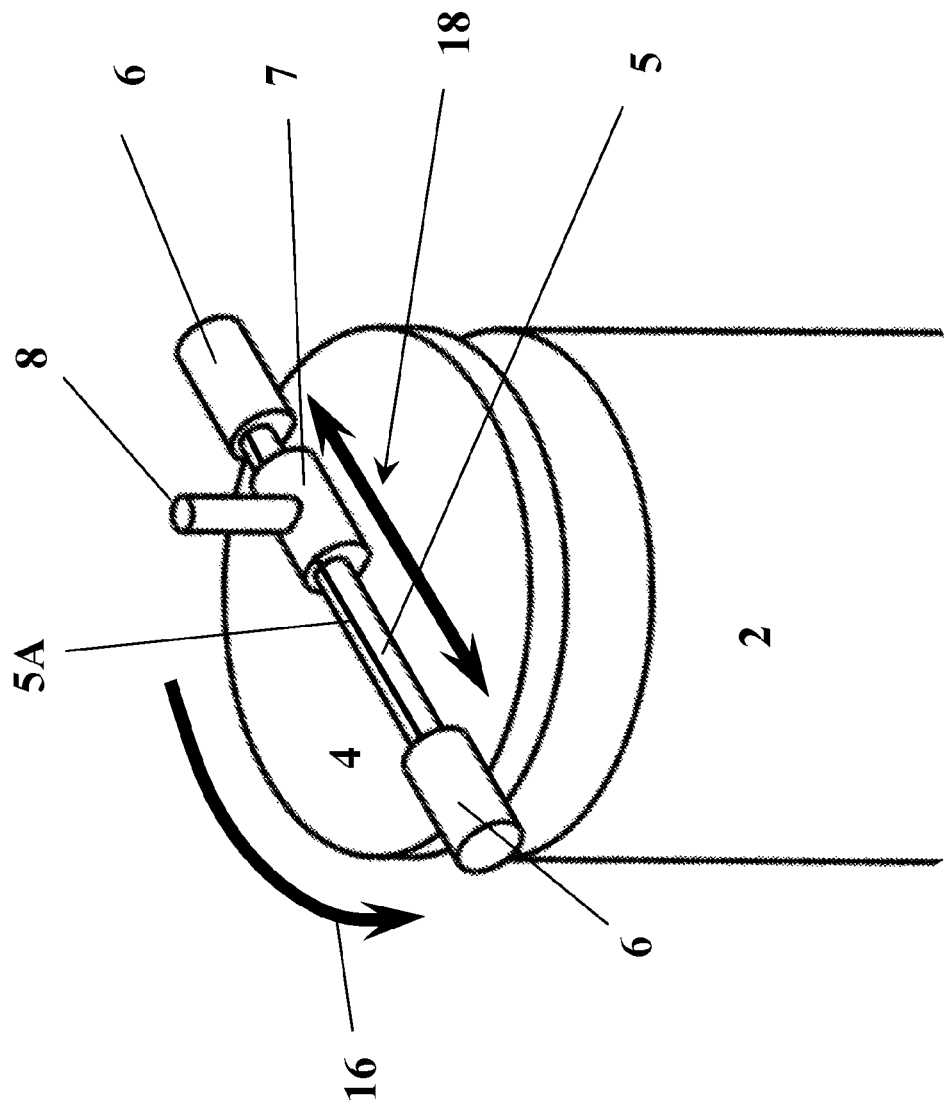
FIG. 2 is a perspective view of a portion of the first embodiment of the sub-drive mechanism shown in FIG. 1.

Turning to FIG. 1, sub-mechanism 1 includes motor 2 and conversion unit 201. During operation, motor 2 turns drive shaft 3 rotates in a single direction as shown by arrow 16 (FIG. 2). In the embodiment shown, drive shaft 3 is driven directly by motor 2, although various additional mechanisms, such as gearing, clutching, and the like, can be interposed between motor 2 and drive shaft 3 is may be desirable or necessary.

Slider support rod 5 is mounted onto and perpendicular to drive shaft 3. In the embodiment shown in FIG. 1, this mounting is not direct; base 4 is mounted onto drive shaft 3 and slider support rod 5 is in turn mounted onto base 4. Base 4 as shown is in the form of a circular plate, but can be of any arbitrary shape provided it serves as a mount for slider support rod 5 and supports it in the needed orientation. Slider support rod 5 (and base 4 in the embodiment shown) rotates when drive shaft 3 is rotated.

Slider 7 is movably mounted onto slider support rod 5, so during operation, slider 7 can move along at least a portion of the length of slider support rod 5. In the embodiment shown in FIGS. 1-5, stops 6 are mounted at or near the opposing ends of slider support rod 5 and together define the maximum distance through which slider 7 can travel across slider support rod 5. Preferably, means are provided to exert a force on slider 7 towards one of the ends of slider support rod 5 so that, in the absence of constraint or externally applied forces, slider 7 will move to a predetermined end of slider support rod 5. A simple spring mechanism is sufficient for this purpose. Such a spring can be mounted around or within slider support rod 5.

Slider 7 includes engagement rod 8, which extends from a surface of slider 7 perpendicular to slider support rod 5 and parallel to drive shaft 3. Engagement rod 8 is long enough to engage slotted reciprocator 9. When drive shaft 3 rotates, slider support rod 5 also rotates, imparting a circular or elliptical motion to slider 7 and engagement rod 8.

Slider support rod 5 and/or slider 7 are adapted such that slider 7 is maintained in a fixed orientation relative to slider support rod 5, i.e., such that slider 7 cannot rotate about slider support rod 5. In this way, engagement rod 8 is maintained in a constant orientation in space. In FIG. 2, slider support rod 5 includes ridge 5A that communicates with a corresponding slot in slider 7 to accomplish this.

Figure 3:
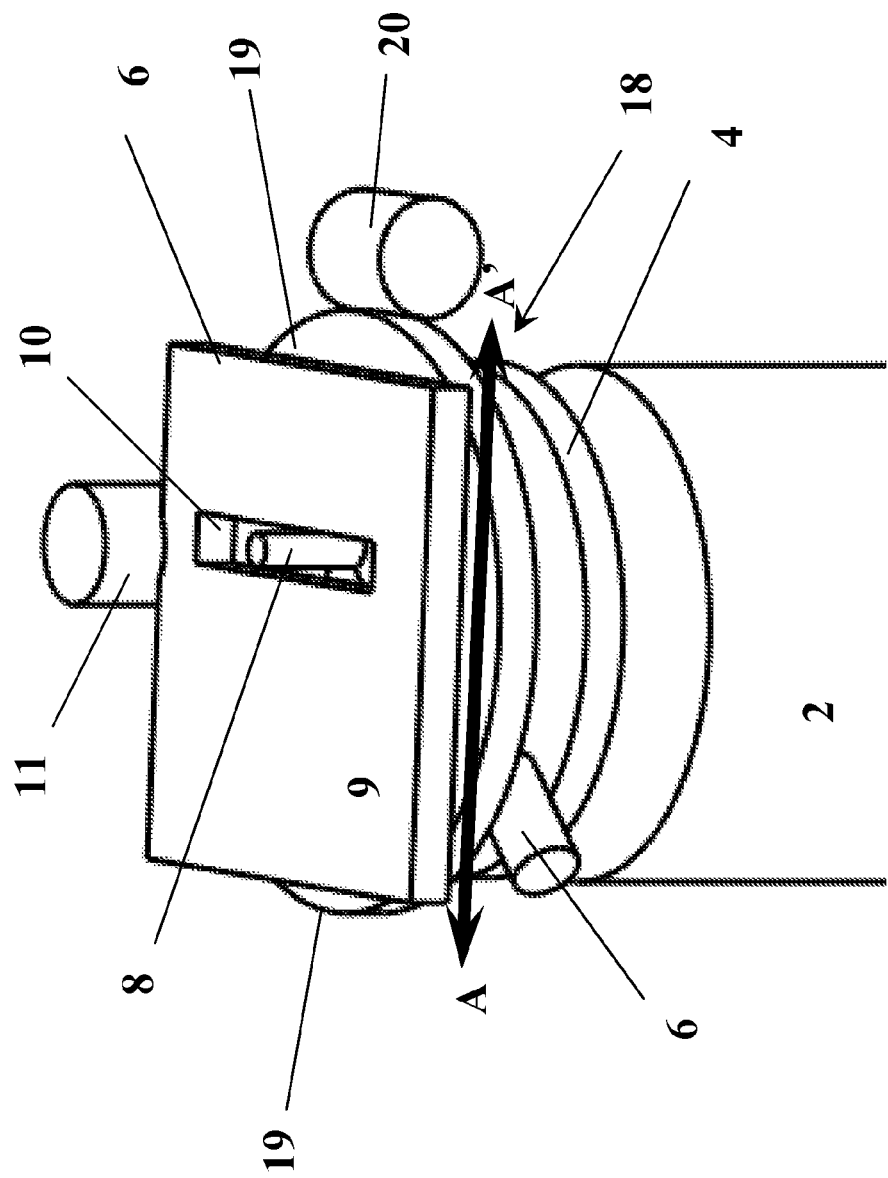
FIG. 3 is a perspective sectional view of a second portion of the first embodiment of the sub-mechanism shown in FIG. 1.

As seen in FIG. 3, slotted reciprocator 9 includes slot 10, which receives engagement rod 8 of slider 7. Reciprocator 9 is slidably mounted, so when slider support rod 5 rotates, imparting a circular or elliptical motion to slider 7 and engagement rod 8, a linear back-and-forth motion is imparted to reciprocator 9. The direction of the motion is generally perpendicular to the length of slot 10, as shown by double-headed arrow A-A' in FIG. 3. Slot 10 should be long enough to accommodate movement of slider 7 along slider support rod 5. The width of slot 10 should closely match the diameter of engagement rod 8 while allowing engagement rod 8 to move freely along the length of slot 10.

Rotatably mounted output mechanism 12 is engaged with slotted reciprocator 8 such that when slotted reciprocator 9 moves linearly back-and-forth, a corresponding alternating rotary motion is imparted to rotatably mounted output mechanism 12. In the embodiment shown in FIGS. 1-5, rotatably mounted output mechanism 12 includes pinion gear 11, rotating output gear 13 and output shaft 14. In this embodiment, pinion gear 11 engages with rack gear 52 on the side of slotted reciprocator 9, and so moves rotatably back-and-forth with slotted reciprocator 9. Pinion gear 11 also engages with output gear 13, rotating output gear 13 back-and-forth with the movement of slotted reciprocator 9, in this way producing an alternating rotary motion to output mechanism 12.

Figure 4:
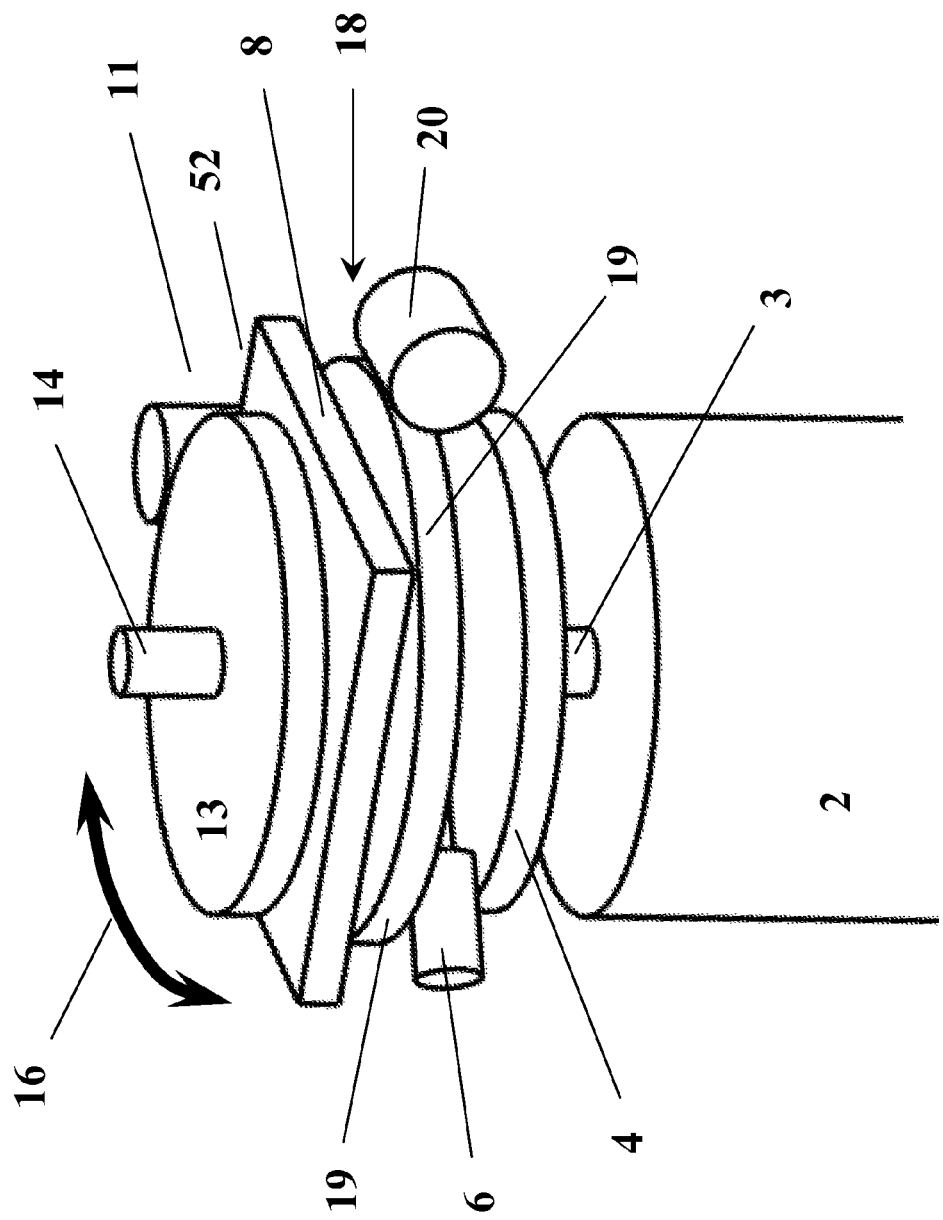
FIG. 4 is a perspective sectional view of a third portion of the first embodiment of the sub-mechanism shown in FIG. 1.
Figure 5:
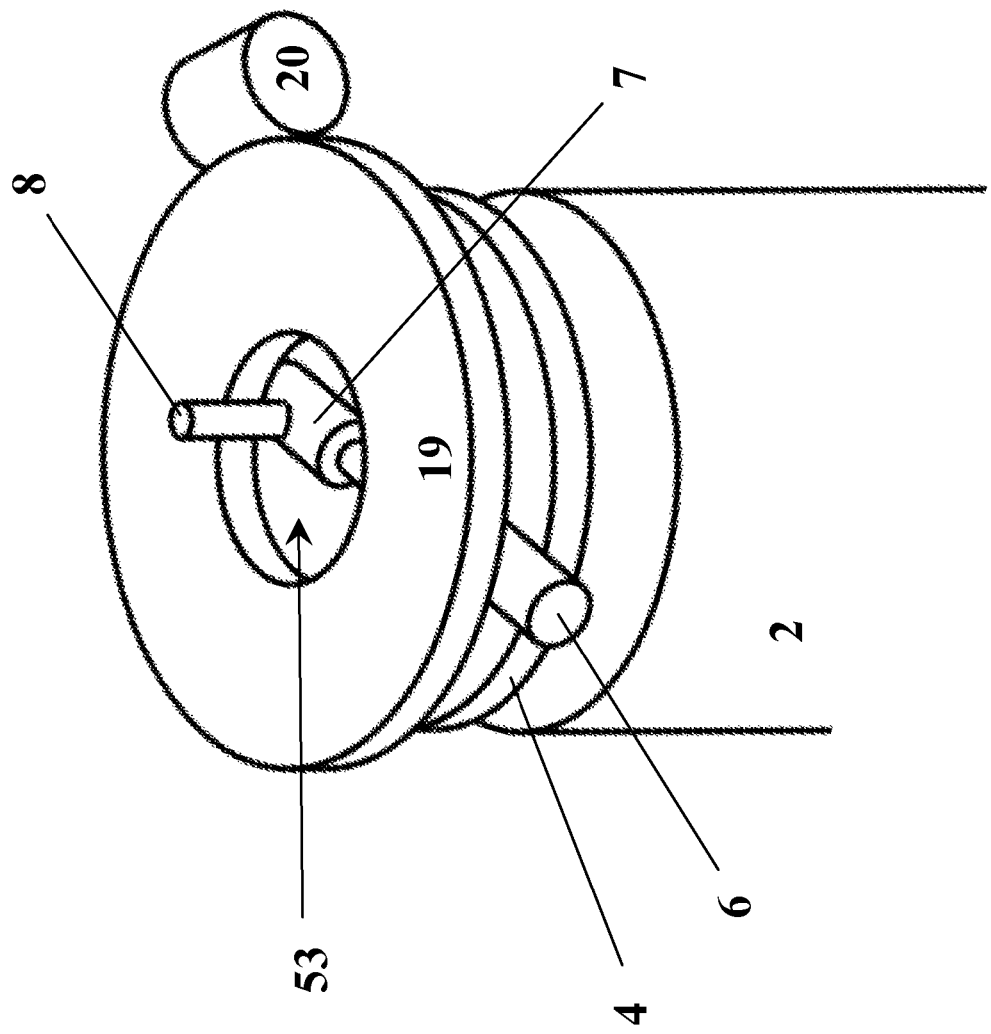
FIG. 5 is a perspective sectional view of a fourth portion of the first embodiment of the sub-mechanism shown in FIG. 1.

The amplitude of the alternating rotary motion of output mechanism 12 is controlled via an optional but preferred amplitude control means, shown generally at 18 in FIGS. 1, 3 and 4. The "amplitude" of the alternating rotary motion refers to the number of degrees of arc through which output mechanism moves during each cycle, greater amplitude corresponds to movement through a larger arc. In the embodiment shown in FIGS. 1-5, amplitude control means 18 controllably varies the extent of movement of slider 7 along slider support 5 as slider support 5 rotates. This controls the amplitude of the motion of slider 7 (i.e., the linear distance slider 7 can traverse along slider support rod 5), which in turn controls the amplitude of the back-and-forth movement of slotted reciprocator 9, which then controls the amplitude of the alternating rotary motion of output mechanism 12.

The embodiment shown in FIGS. 1-5 illustrates a case in which the amplitude control means adjusts the position of the slider on the slider support rod. In the specific embodiment shown, amplitude control means 18 includes iris 19 and iris activator 20. Iris 19 is interposed between slider 7 and slotted reciprocator 9. Engagement rod 8 of slider 7 extends through opening 53 of iris 19 and then into slot 10 of slotted reciprocator 9. Iris 19 defines opening 53. By opening iris 19 to expand opening 53, greater freedom of movement is permitted to elongated rod 8 (and therefore slider 7), and slider 7 can therefore traverse a greater distance along slider support rod 5 as slider support rod 5 rotates with drive shaft 3. This greater movement of slider 7 and engagement rod results in a longer back-and-forth movement of slotted reciprocator 9, which in turn increase the amplitude of the rotary movement of output mechanism 12.

Conversely, by closing iris 19 to close opening 53, the movement of engagement rod 8 and slider 7 along slider support rod 5 becomes restricted. This reduces the back-and-forth motion of slotted reciprocator 9 and, in turn, reduces the amplitude of the alternating rotary motion of output mechanism 12.

In the embodiment shown in FIGS. 1-5, iris activator 20 controls the opening and closing of iris 19. Activator 20 preferably responds to a control signal from a controlling device to open and/or close iris 19. The control signal can in turn be produced according to manual or automatic controls.

In the embodiment shown in FIGS. 1-5, torsion control means 15 is mounted on output shaft 14 to allow for the storage and conservation of energy. Such a torsion control means can be mechanical (such as a spring, for example), electrical, pneumatic or hydraulic in nature. Torsion spring can provide a desired resistance against output shaft 14, to control, for example, the operating frequency at a desired rate, such as approximately the natural resonating frequency of the wing-drive mechanism or some portion thereof.

Figure 6:
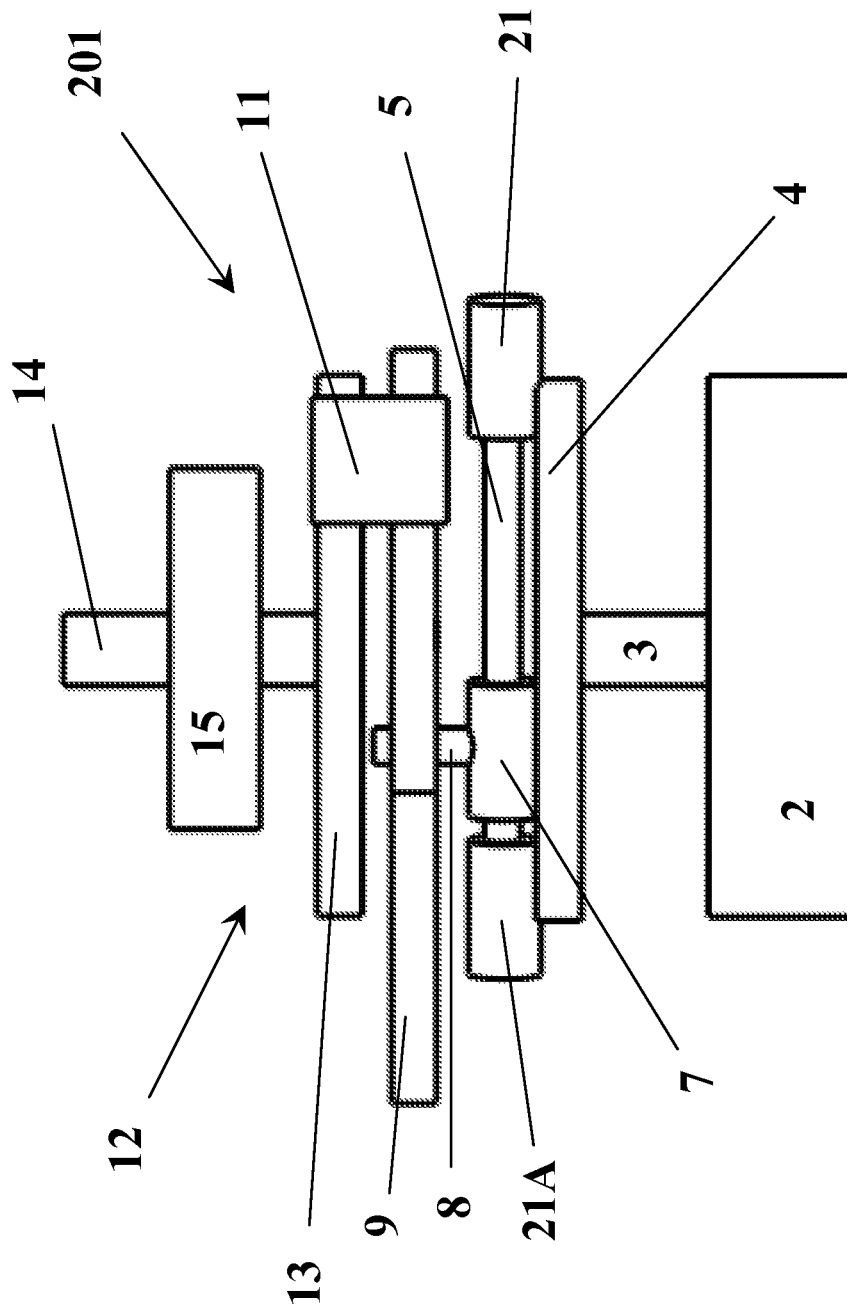
FIG. 6 is a front view of a second embodiment of a motor and conversion unit of sub-mechanism of the wing-drive mechanism of the invention.

The embodiment shown in FIG. 6 is a variation of that shown in FIGS. 1-5, and operates in generally the same manner. In FIGS. 6-16, reference numerals not otherwise identified refer to similarly numbered features in FIGS. 1-5. Instead of iris 19 and iris activator 20 (as in FIGS. 1-5), the optional amplitude control means includes motors 21 and 21A rotating support rod 5 on which is mounted slider 7. In this embodiment, slider support rod 5 is spirally threaded and lacks ridge 5A. Slider 7 is spirally threaded to receive rod 5. Upon actuation of either of motors 21 or 21A, which rotate support rod 5, the slider 7 is positioned at a selected point along the length of rod 5, thus varying the amplitude imparted by engagement rod 8 with slotted reciprocator 9. Amplitude control in this case is achieved through operation of the motors. The motors could operate in one direction only (opposite to each other), or one motor may be used to operate in both directions. This method of amplitude control could also be used in the embodiments depicted in FIGS. 7-12.

Figure 7:
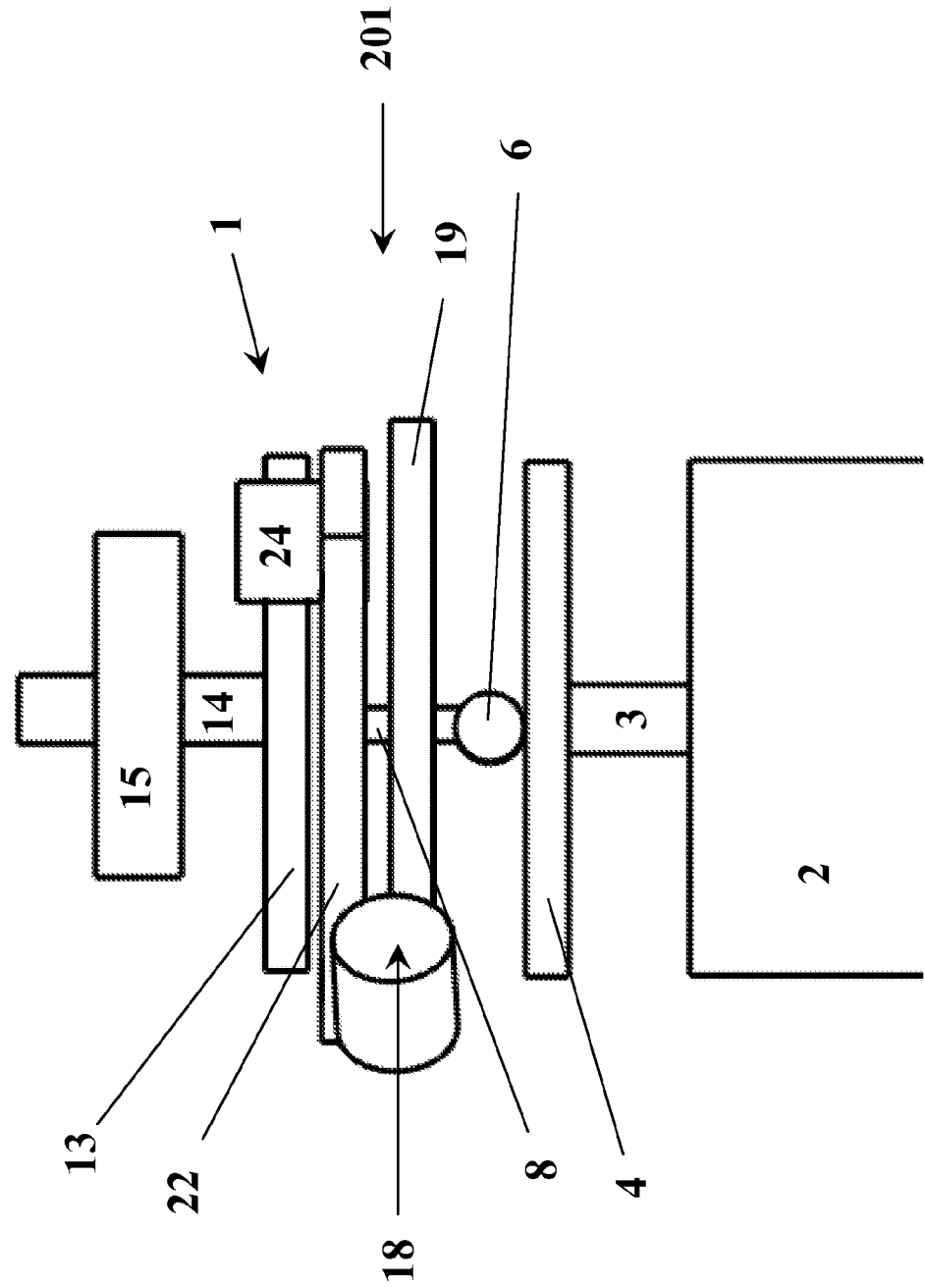
FIG. 7 is a front view of a third embodiment of a motor and conversion unit of a sub-mechanism of the wing-drive mechanism of the invention.
Figure 8:
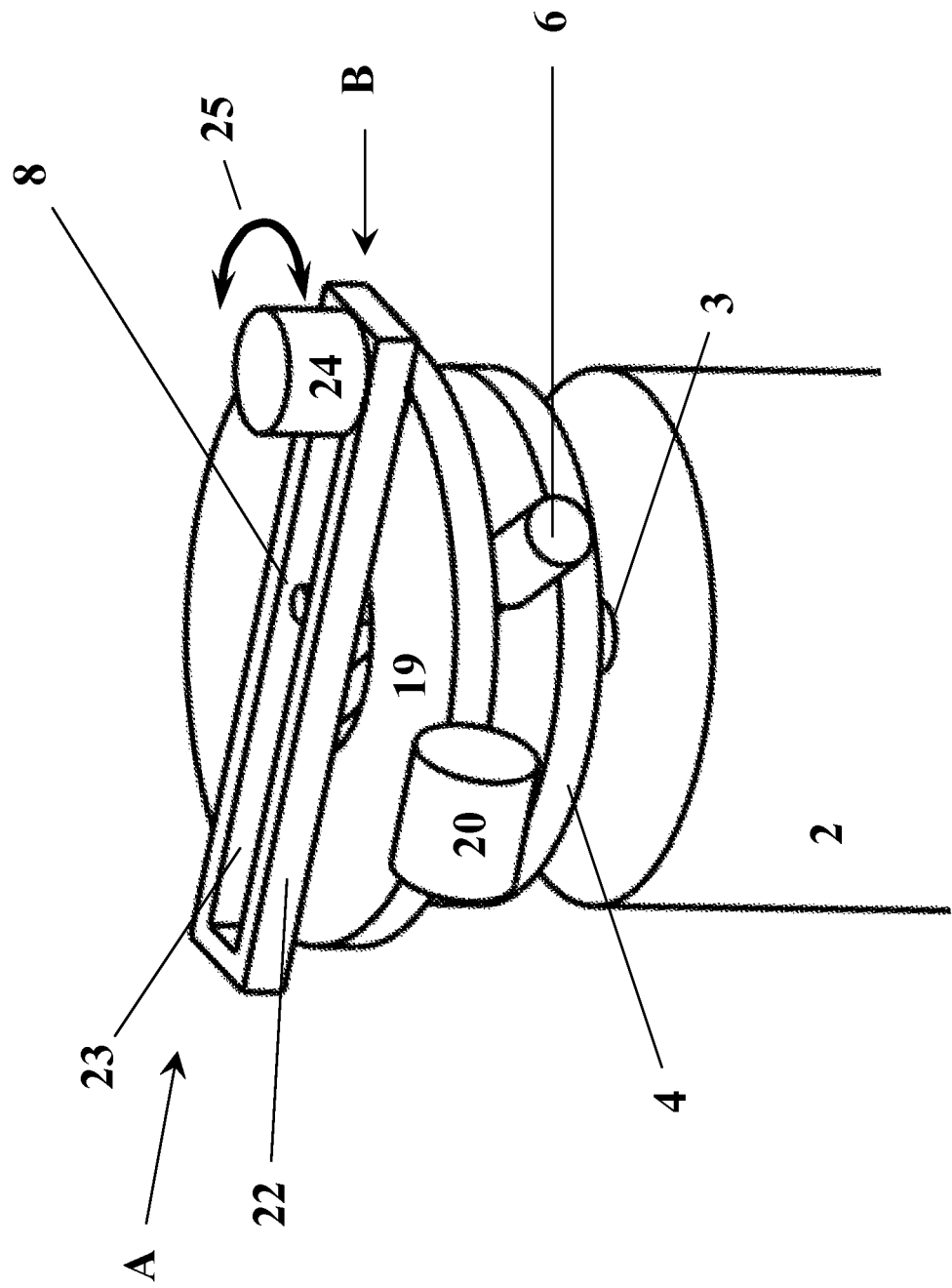
FIG. 8 is a perspective sectional view of a portion of the third embodiment of the sub-mechanism shown in FIG. 7.
Figure 9:
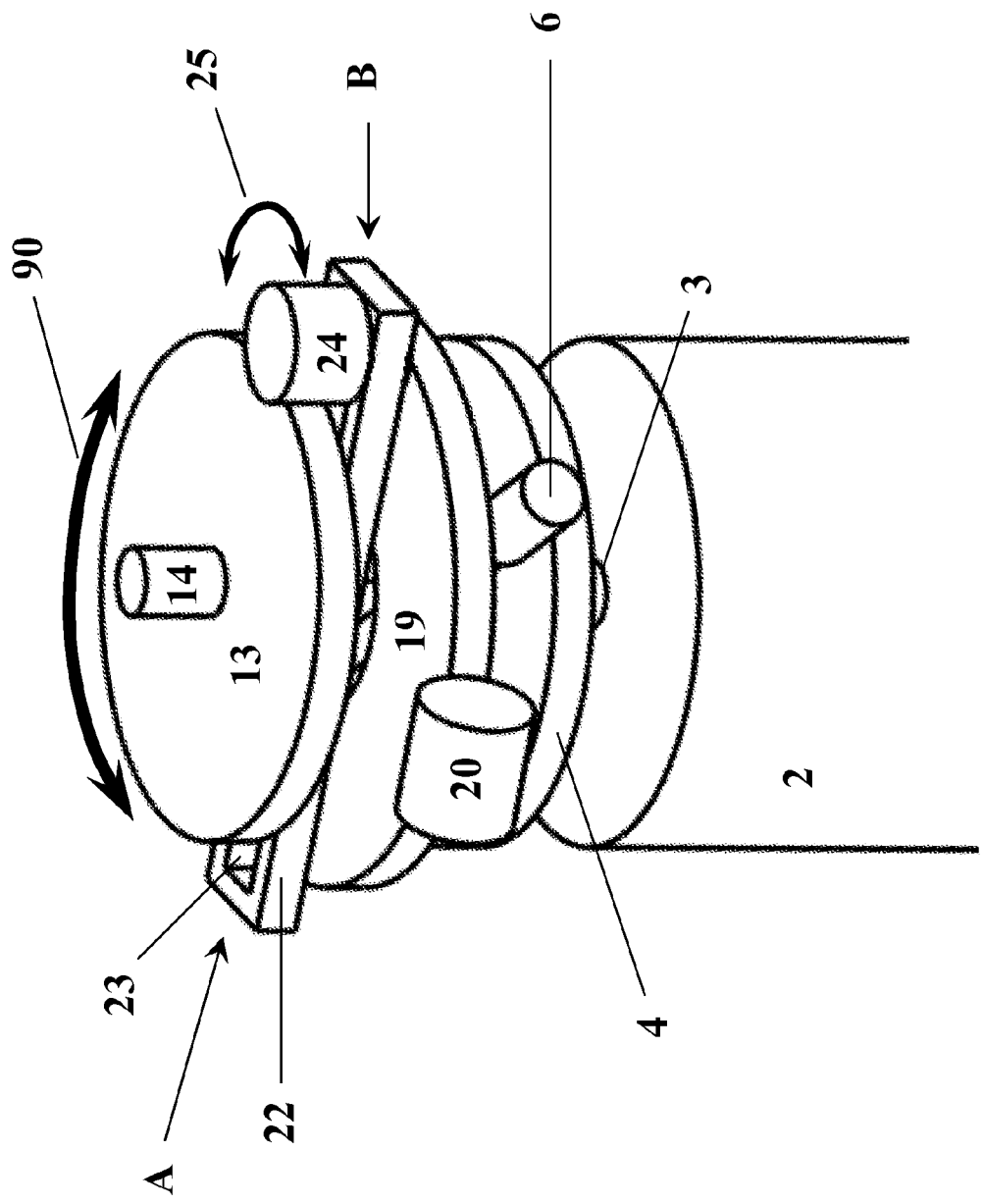
FIG. 9 is a perspective sectional view of a second portion of the third embodiment of the sub-mechanism shown in FIG. 7.

FIGS. 7-9 illustrate another variation of the embodiment of FIG. 1, in which slotted reciprocator 9 (FIGS. 1 and 3) is replaced with slotted swivel arm 22. As shown most clearly in FIG. 8, swivel arm 22 is pivotally mounted such that engagement rod 8 of slider 7 fits into slot 23. Swivel arm 22 is pivotally mounted at end A (FIG. 8). At end B, pivot gear 24 is mounted onto swivel arm 22 so that both move back-and-forth as swivel arm 22 pivots about the pivot point at end A. As slider 7 moves in response to the rotation of shaft 3, end B of swivel arm 22 and pivot gear 24 move back-and-forth in the direction indicated by double-headed arrow 25. As shown in FIG. 9, pivot gear 24 engages with rotatably mounted output mechanism 12 which in this embodiment includes output gear 13 and output shaft 14 as before. Pivot gear 24 engages output gear 13. As pivot gear 24 moves back-and forth, it imparts an alternating rotary motion to rotatably mounted output mechanism 12 as indicated by double-headed arrow 90.

The embodiment shown in FIGS. 7-9 includes an optional amplitude control means, including iris 19 and iris activator 20. Other amplitude control means as described herein can be used with the embodiment shown in FIGS. 7-9.

Figure 10:
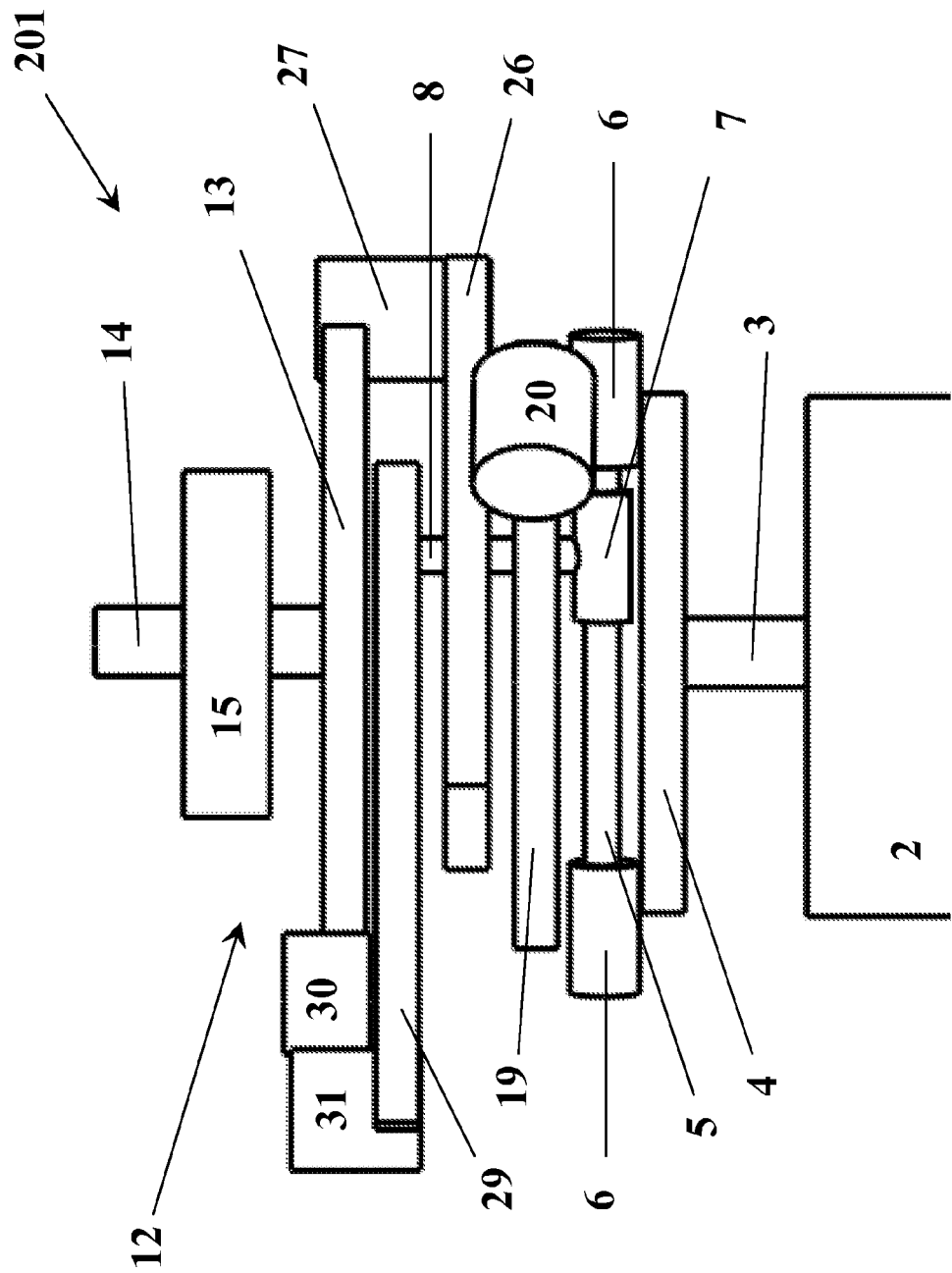
FIG. 10 is a front view of a fourth embodiment of a motor and conversion unit of a sub-mechanism of a wing-drive mechanism of the invention.
Figure 11:
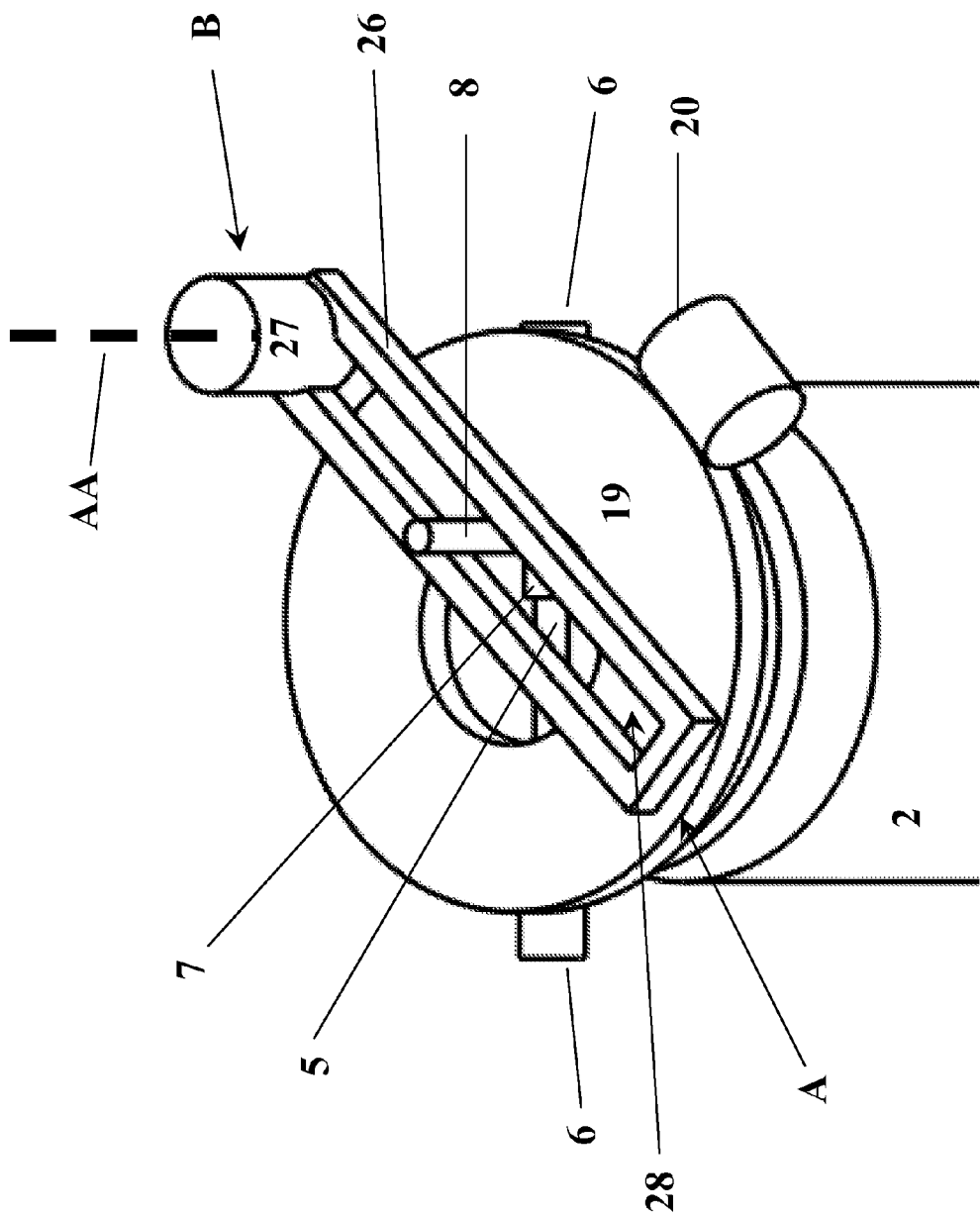
FIG. 11 is a perspective sectional view of a portion of the fourth embodiment of the wing-drive mechanism shown in FIG. 10.
Figure 12:
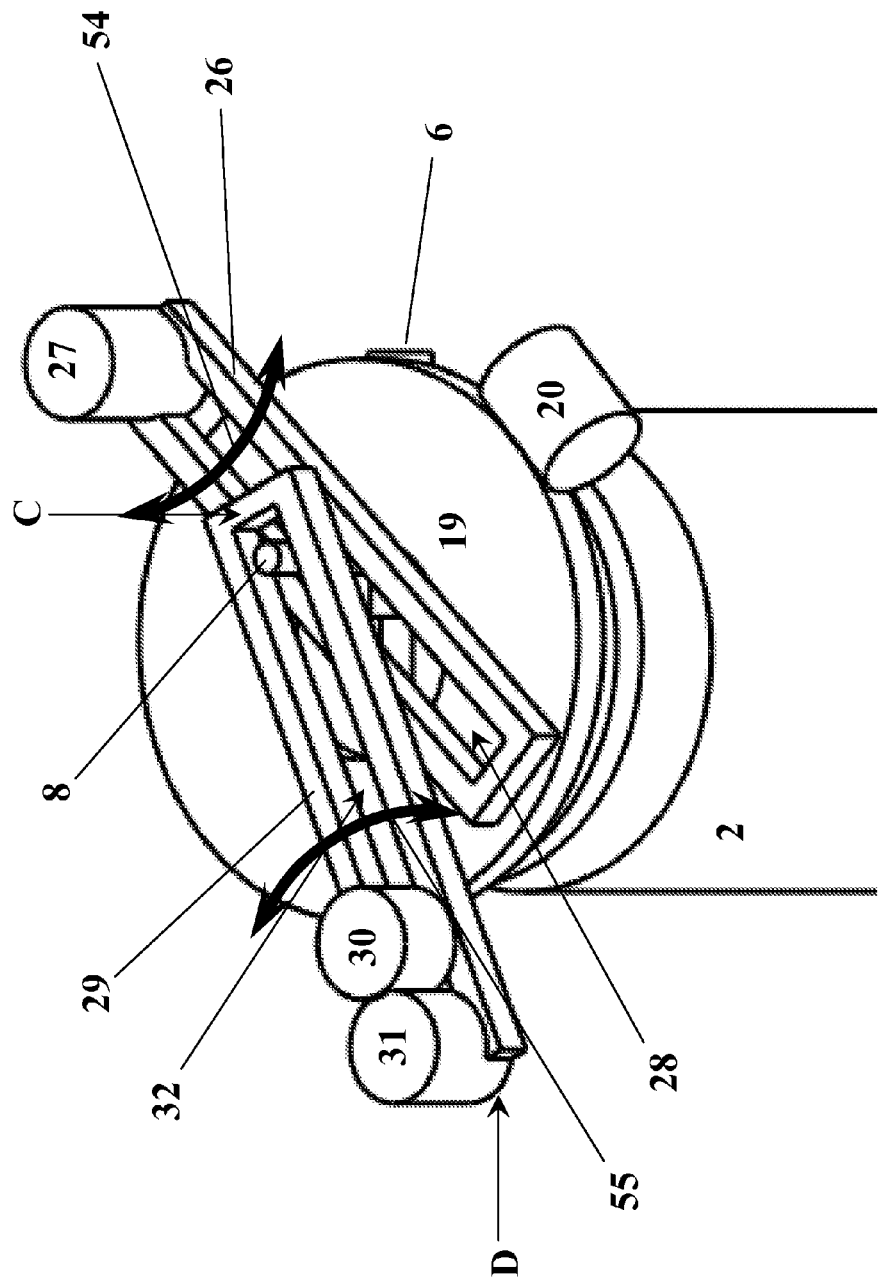
FIG. 12 is a perspective sectional view of a second portion of the fourth embodiment of the sub-mechanism shown in FIG. 10.

Still another variation is shown in FIGS. 10-12. In this case, slotted reciprocator 9 (FIGS. 1 and 3) is replaced with first and second slotted swivel arms 26 and 29. As shown most clearly in FIG. 11, first slotted swivel arm 26 is pivotally mounted such that engagement rod 8 of slider 7 fits into slot 28. First slotted swivel arm 26 is pivotally mounted at end A (FIG. 11). At end B, first ratcheted gear 27 is mounted onto first slotted swivel arm 26. First ratcheted gear 27 is ratcheted to permit it to turn in only one direction. First ratcheted gear 27 engages with output mechanism 12, which includes output gear 13 and output shaft 14 as described with respect to earlier embodiments.

Second slotted swivel arm 29 is mounted such that engagement rod 8 fits into one end of slot 32 and pivots around the pivot point at end C. Second ratcheted gear 31 and reversing cog 30 are mounted at the opposing end D of second slotted swivel arm 29. Second ratcheted gear 31 is ratcheted so it can rotate only in the direction that first ratcheted gear 27 is able to rotate. Reversing cog 30 is rotatably mounted and can rotate in both directions. Reversing cog 30 is engaged with both second ratcheted gear 31 and output gear 13 of output mechanism 12.

As slider 7 moves in response to the rotation of shaft 3, end B of first slotted swivel arm 26 and first ratcheted gear 27 move back-and-forth in the direction indicated by double-headed arrow 54, and swivel arm 29 and second ratcheted gear 31 move back-and-forth in the direction indicated by double-headed arrow 55. In the embodiment shown in FIGS. 10-12, ratcheting gears 27 and 31 operate so that motion imparted to gear 13 is of a reciprocating fashion. When ratcheting gear 27 is engaged in one direction (say clockwise), ratcheting gear 31 will be disengaged (since its direction will be anti-clockwise), and visa versa. The reversing cog 30 permits this reciprocating action to occur. Each of the ratcheting gears only allows engagement in one direction only—either both engage clock-wise, or both engage anti-clockwise.

The embodiment shown in FIGS. 10-12 includes an optional amplitude control means, in this case an iris mechanism as described with respect to FIGS. 1-5, although other amplitude control mechanisms as described herein are also suitable.

Figure 13:
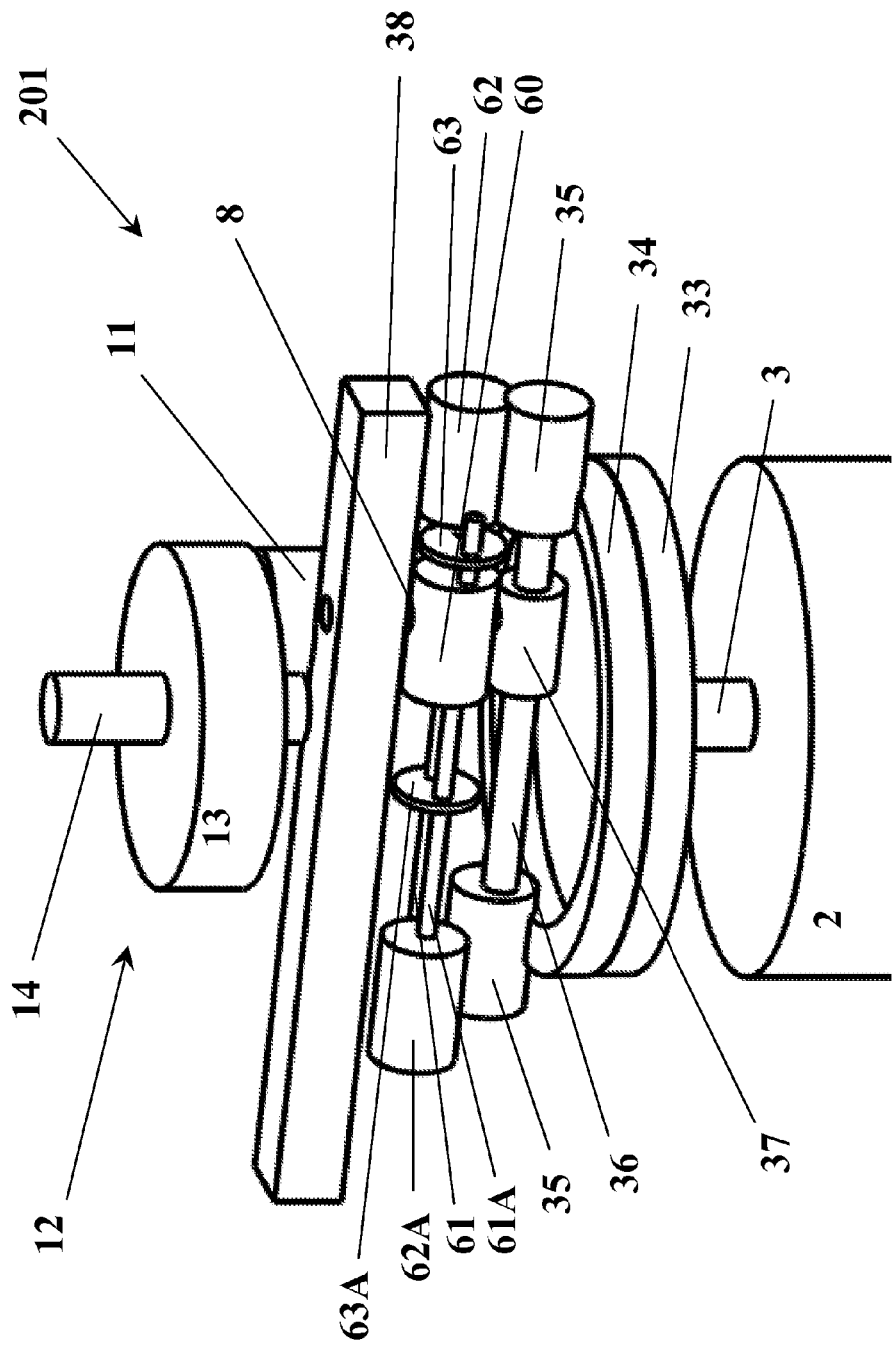
FIG. 13 is a front view of a fifth embodiment of a motor and conversion unit of a sub-mechanism of a wing-drive mechanism of the invention.

Another embodiment is shown in FIG. 13. In FIG. 13, motor 2 rotates drive shaft 3 as described with respect to the embodiments shown in FIGS. 1-5. Support disk 33 is mounted onto drive shaft 3 and rotates with it. Support disk 33 includes raised rim gear 34. Support disk 33 and rim gear 34 can be combined into a single body.

Dual spiral slotted gear shaft 36 is rotatably mounted along a fixed longitudinal axis. Gears 35 are mounted onto gear shaft 36. Gears 35 mesh with rim gear 34 such that gears 35 and gear shaft 36 rotate along the longitudinal axis of gear shaft 36 when disc 33 and rim gear 34 rotate. Either one, and only one, of gears 35 is allowed to rotate freely with respect to dual spiral slotted gear shaft 36. Spiral gear follower 37 is mounted on gear shaft 36 and travels in a linear back-and-forth motion as gear shaft 36 rotates in either direction. Spiral gear follower 37 engages with follower 60, which are mounted on follower support rods 61 and 61A (which could be replaced with a single follower support rod).

Follower 60 includes an engagement rod, which extends from a surface of follower 60 as described before with respect to slider 7 in FIGS. 1-5. The engagement rod is long enough to engage rack gear 38. Rack gear 38 engages with pinion gear 11 of output mechanism 12. Output mechanism 12 as shown also includes rotating output gear 13 and output shaft 14. The amplitude is controlled through the positions of end stops 6, which constrain the movement of follower 60 along follower support rod 61.

In the embodiment shown, an optional amplitude control means is provided. Follower support rods 61 and 61A are threaded. Travel limiting motors 62 and 62A are mounted onto opposing ends of threaded drive shafts 61 and 61A, respectively. Travel limiting nut 63 is screw-mounted (via internal threads) onto threaded follower support rod 61 and slidably mounted onto threaded follower support rod 61A. Travel limiting nut 63A is screw-mounted (via internal threads) onto threaded follower support rod 61A and slidably mounted onto threaded follower support rod 61.

Follower 60 is positioned between travel limiting nuts 63 and 63A such that travel limiting nuts 63 and 63A constrain the movement of follower 60 along threaded follower support rods 61 and 61A. By operating travel limiting motors 62 and/or 62A, the position of travel limiting nuts 63 and 63A along threaded follower support rods 61 and 61A is maintained, thereby controlling the extent of movement of follower 60 along threaded support rods 61 and 61A and controlling amplitude.

This embodiment can be further modified to include disengagement means for disengaging follower 60 from spiral gear follower 37, or spiral gear follower 37 from dual spiral slotted gear shaft 36. Operation of the disengagement means permits output mechanism 12 to be disengaged from the motion of motor 2, and/or permits the amplitude of motion of output mechanism 12 to be reduced to zero. Such disengagement means can include, for example, cams affixed to travel limiting nuts 63 and 63A, such that follower 60 is lifted when travel limiting nuts 63 and 63A both are moved close to follower 60.

Figure 14:
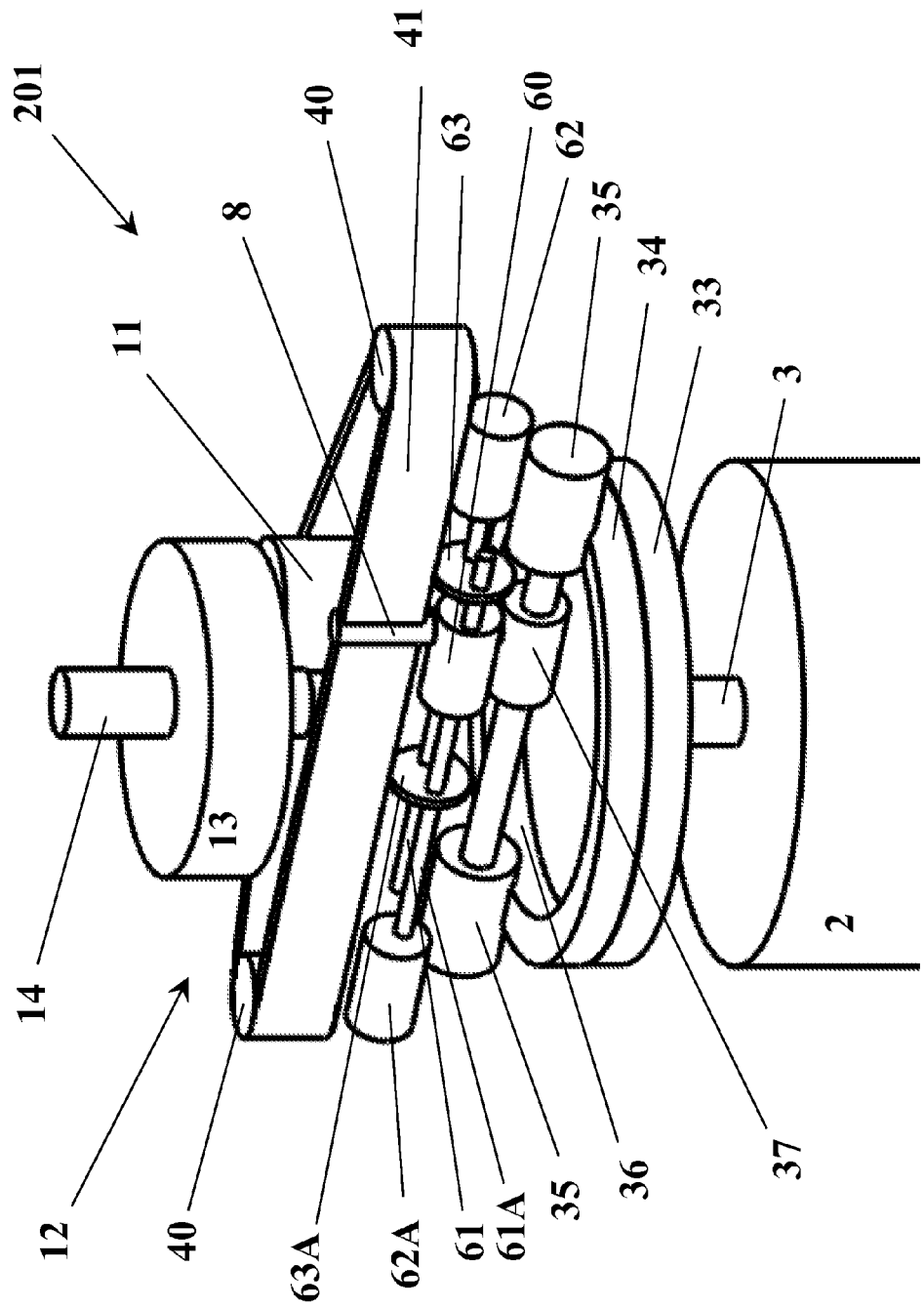
FIG. 14 is a front view of a motor and conversion unit of a sixth embodiment of a sub-mechanism of a wing-drive mechanism of the invention.

The embodiment shown in FIG. 14 is a variation that shown in FIG. 13. Reference numbers in FIGS. 14-16 which are not otherwise identified refer to similarly numbered features of FIGS. 1-13. In the embodiment shown in FIG. 14, rack gear 38 of FIG. 13 is replaced with pulley-and-idler-gear system 39 which consists of flexible pulley 41 mounted on idler gears 40. Flexible pulley 41 is affixed to engagement rod 8 of follower 60, and is moved back-and-forth with the movement of follower 60. Flexible pulley 41 engages with pinion gear 11, of output mechanism 12. The back-and-forth motion of flexible pulley 41 produces an alternating rotary motion to output mechanism 12 as before.

Figure 15:
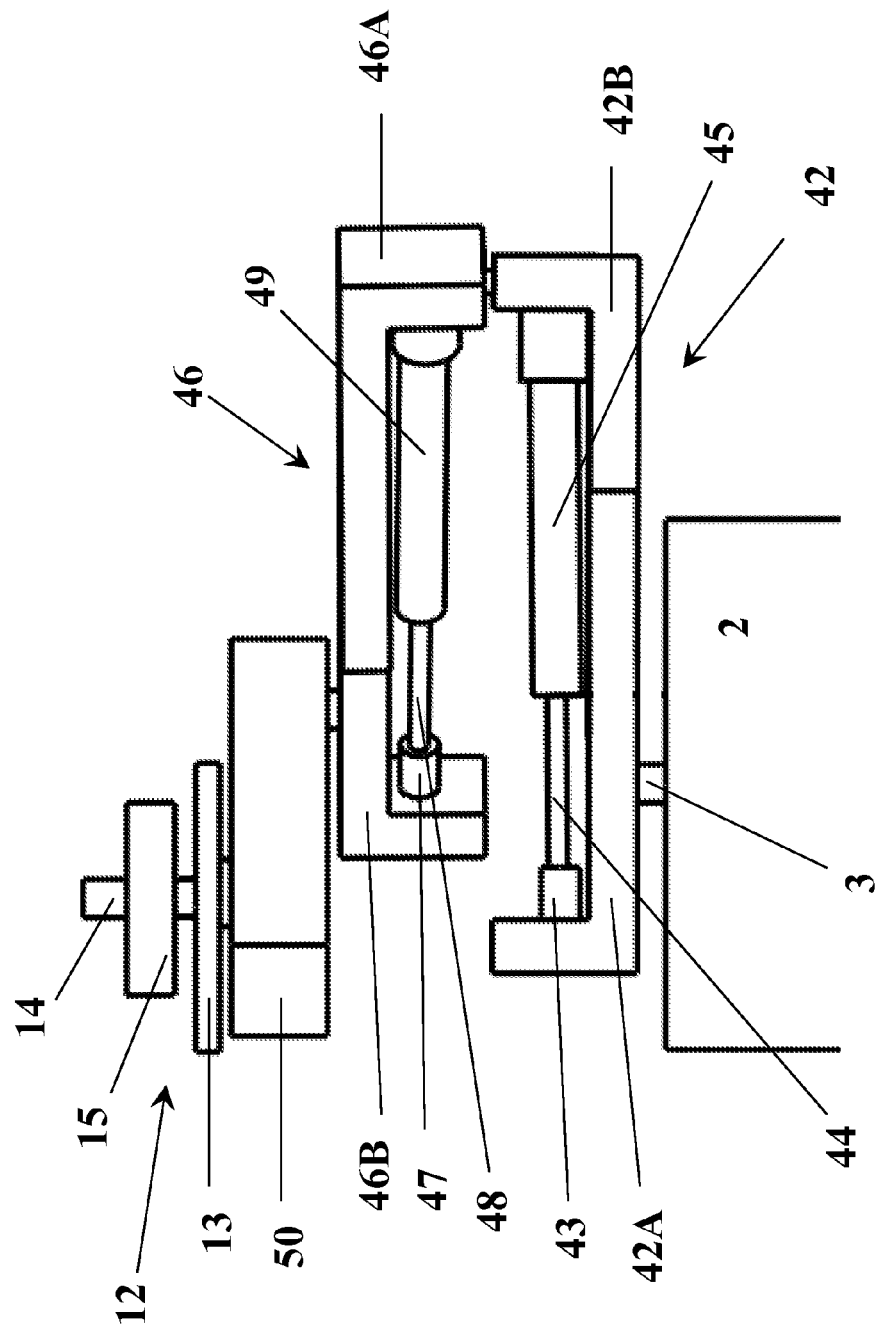
FIG. 15 is a front view of a seventh embodiment of motor and conversion unit of a sub-mechanism of a wing-drive mechanism of the invention.
Figure 16:
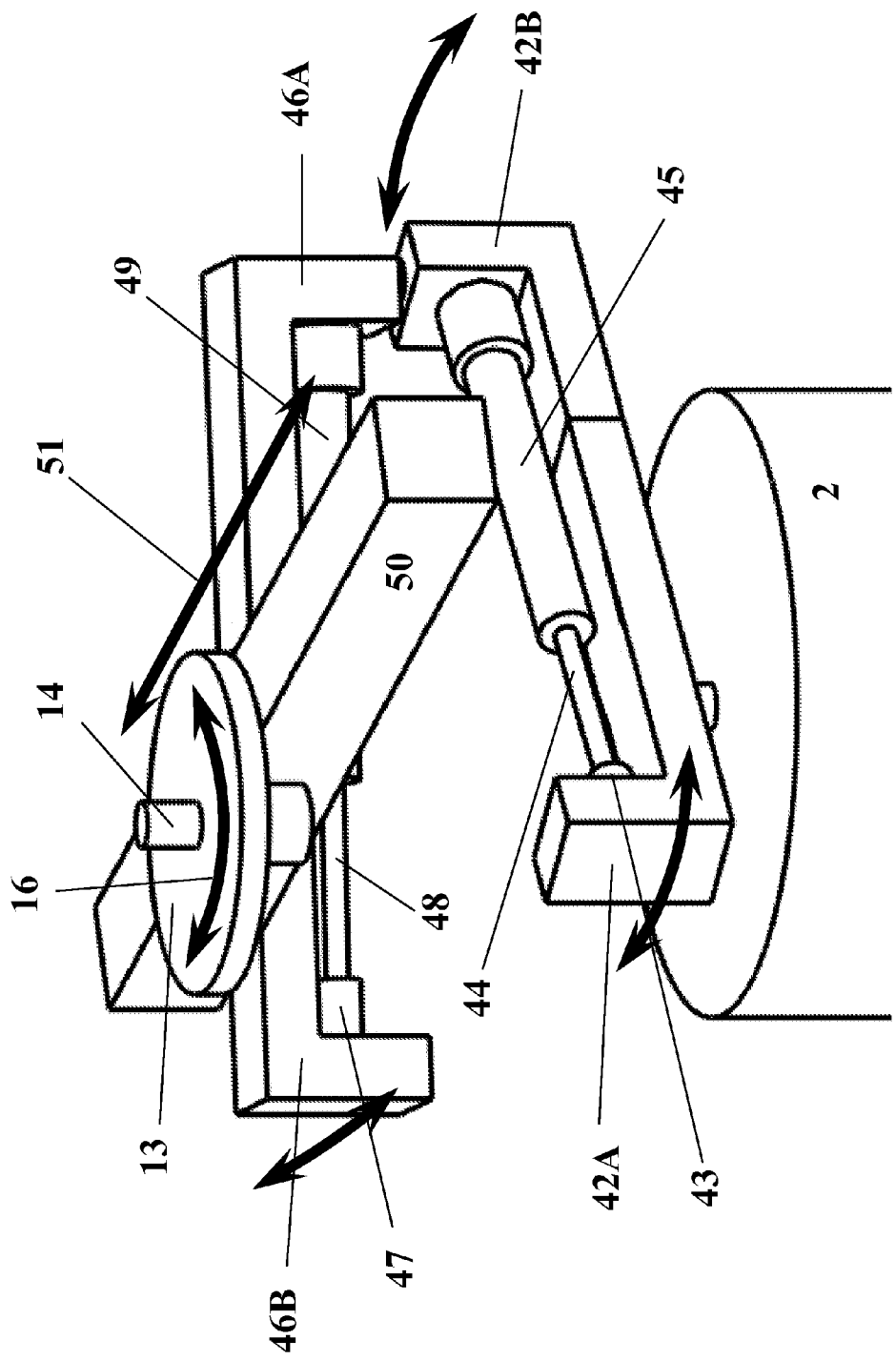
FIG. 16 is a perspective view of the seventh embodiment of the motor and conversion unit of the sub-mechanism shown in FIG. 15.

In the embodiment shown in FIGS. 15-16, first shaft support 42 is mounted onto drive shaft 3 such that first shaft support 42 rotates with drive shaft 3.

Second telescoping shaft support 46 is pivotably mounted onto first shaft support 42.

One end of guided slider 50 is pivotably mounted onto second telescoping shaft support 46. Guided slider 50 is also pivotably mounted at the opposing end onto a mounting (not shown) which constrains the motion of guided slider 50 in a linear direction indicated by double-headed arrow 51 as drive shaft 3 rotates.

As drive shaft 3 rotates, first shaft support 42 and telescoping shaft support 46 impart an alternating, linear back-and-forth motion to guided slider 50. Guided slider 50 engages output mechanism 12, which in this embodiment includes output disk 13 and output shaft 14 as before, such that as guided slider 50 moves back-and-forth, an alternating rotary motion is imparted to output mechanism 12 as indicated by double-headed arrow 16.

In the embodiments shown in FIGS. 15-16, an optional amplitude control means is achieved through the design of the first and second support shafts, which telescope in response to the operation of control motors 43 and 47. Thus, first section 42A of first shaft support 42 is mounted onto drive shaft 3 such that first shaft support 42 rotates with drive shaft 3. Second section 42B is slidably mounted onto first section 42A of first shaft support 42. Control motor 43 is mounted onto first section 42A, and operates to rotate threaded shaft 44 in either direction in response to a control signal. Telescoping shaft 45 has a threaded inner bore which receives threaded shaft 44. Telescoping shaft 45 is mounted on second section 42B. Upon rotation of threaded shaft 44 in one direction via operation of motor 43, telescoping shaft 45 is forced outward and in turn forces second section 42B outward, thereby extending the length of first shaft support 42. Upon rotation in the opposite direction, telescoping shaft 45 is pulled inward and in turn forces second section 42B inward, reducing the length of first shaft support 42.

First section 46A of second shaft support 46 is pivotably mounted onto second section 42B of first shaft support 42. Second section 46B is slidably mounted onto first section 46A of second shaft support 46. Control motor 47 is mounted onto second section 46B, and operates to rotate threaded shaft 48 in either direction in response to a control signal. Telescoping shaft 49 has a threaded inner bore which receives threaded shaft 48. Telescoping shaft 49 is mounted on first section 46A of second shaft support 46. Upon rotation of threaded shaft 48 in one direction, telescoping shaft 49 is forced outward and in turn forces second section 46B outward, thereby extending the length of second shaft support 46. Upon rotation of threaded shaft 48 in the opposite direction, telescoping shaft 49 is pulled inward and in turn forces second section 46B inward, reducing the length of second shaft support 46.

Control motors 43 and 47 operate in tandem to simultaneously increase or decrease the lengths of first shaft support 42 and second shaft support 43. Increasing their lengths increases the amplitude of the rotary motion imparted to output mechanism 12, whereas decreasing their lengths decreases the amplitude.

Configuration of Wing-Drive Mechanisms

The invention in some aspects is also a vehicle having a fuselage and a pair of opposing first and second wing-drive mechanisms on opposing sides of said fuselage, wherein each of said opposing first and second wing-drive mechanisms includes a) an outwardly extending spar that is moveable independently in flap, yaw and pitch directions about a pivot point;

b) an inwardly extending spar that is movable independently in flap, yaw and pitch directions about the pivot point;

c) a flap-drive sub-mechanism for moving said outwardly extending spar about the pivot point in a flap direction, said flap-drive sub-mechanism including a motor shaft;

d) a yaw-drive sub-mechanism for moving said outwardly extending spar about the pivot point in a yaw direction, said yaw-drive sub-mechanism including a rotating or oscillating motor shaft and wherein said yaw-drive sub-mechanism operates independently of said flap-drive sub-mechanism;

e) a pitch-drive sub-mechanism for moving said outwardly extending spar about the pivot point in a pitch direction, wherein said pitch-drive sub-mechanism operates independently of said flap-drive and yaw-drive sub-mechanisms;

and further wherein f) the motor shaft of the flap-drive sub-mechanism of said first wing-drive mechanism and the motor shaft of the flap-drive sub-mechanism of said second wing-drive mechanism rotate or oscillate about the same flap motor axis and g) the motor shaft of the yaw-drive sub-mechanism of said first wing-drive mechanism and the motor shaft of the yaw-drive sub-mechanism of said second wing-drive mechanism rotate or oscillate about the same yaw motor axis.

FIG. 17 illustrates an embodiment of this aspect of the invention. In FIG. 17, opposing first wing-drive mechanism 100 and second wing-drive mechanism 100A are mounted onto or within opposing sides of a fuselage (not shown). First wing-drive mechanism 100 includes outwardly extending spar 102. Outwardly extending spar 102 is moveable independently in flap, yaw and pitch directions about pivot point 104. First wing-drive mechanism 100 further includes inwardly extending spar 117 that also is movable independently in flap, yaw and pitch directions about pivot point 104. In FIG. 17, pivot point 104 is shown in the form of a ball; a corresponding socket-type hold affixed directly or indirectly to the fuselage permits the spar to move in the required manner. However, any means of affixing first wing-drive mechanism 100 directly or indirectly to the fuselage so that outwardly extending spar 102 and inwardly extending spar 117 can move as described about pivot point 104 can be used.

The use of the term "spar" in this specification is not intended to specify any particular shape or configuration. The inwardly extending spar is simply a member that is connected to the pivot point and is in communication with one or of the flap, yaw and pitch-drive sub-mechanisms so that actuation of one or more of those mechanisms effects rotation of the inwardly extending spar about the pivot point. Similarly, the outwardly extending spar is simply a member that is connected to the pivot point and to a drive wing so that movement of the inwardly extending spar by one or more of the flap, yaw and pitch-drive sub-mechanisms effects rotation of the outwardly extending spar about the pivot point. The inwardly extending spar and outwardly extending spar may be formed as a single piece as desired. The outwardly extending spar may be integrally formed with a drive wing. Either may be of any shape or size the permits it to perform the functions described herein.

In the embodiment shown in FIG. 17, pitch-drive sub-mechanism 103 of first wing-drive mechanism 100 includes motor 161 and converter unit 201, which are affixed to inwardly extending spar 117 and second sleeve 131, in the embodiment shown. A pitch motion is imparted to inwardly extending spar 117 and outwardly extending spar 102 via the operation of motor 161.

Inwardly extending spar 117 extends through motor 161 and is coupled to yaw-drive sub-mechanism 121 and flap-drive sub-mechanism 111 of first wing-drive mechanism 100. Flap-drive sub-mechanism 111 includes, in the embodiment shown, first sleeve 130 (which is slidably mounted onto first arcuate guide rail 110), motor 171 and converter unit 201. Upon actuation of motor 171, flap-drive sub-mechanism 111 provides torque to inwardly extending spar 117 via arcuate guide rail 110 and first sleeve 130. The effects movement of inwardly extending spar 117 and outwardly extending spar 102, resulting in a movement in the direction indicated by double-headed arrow A-A'.

Yaw-drive sub-mechanism 121 of first wing-drive mechanism 100 includes, in the embodiment shown, second sleeve 131 (which is slidably mounted onto arcuate guide rail 120), motor 181 and converter unit 201. Upon actuation of motor 181, yaw-drive sub-mechanism 121 provide torque to inwardly extending spar 117 via arcuate guide rail 120 and second sleeve 131. The effects movement of inwardly extending spar 117 and outwardly extending spar 102, resulting in a movement in the direction indicated by double-headed arrow C-C'.

Flap-drive sub-mechanism 111, yaw-drive sub-mechanism 121 and pitch-drive sub-mechanism 103 all operate independently of each other.

As shown in FIG. 17, second wing-drive mechanism 100A is mounted on an opposing side of the fuselage (not shown). The various features of second wing-drive mechanism are numbered in the same way as the corresponding features of first wing-drive mechanism 100, with the addition of an "A" designation. Thus, second wing-drive mechanism 100A includes pitch-drive sub-mechanism 103A, flap-drive sub-mechanism 111A and yaw-drive sub-mechanism 121A, each of which is as described with respect to first wing-drive mechanism 100.

Motors 171 and 171A of flap-drive mechanisms 111 and 111A, respectively, have aligned motor shafts. Upon operation of the motor, those motor shafts rotate or oscillate about the same flap motor axis indicated as dotted line X in FIG. 17. Similarly motors 181 and 181A of yaw-drive mechanisms 121 and 121A have aligned motor shafts. Upon operation of the motor, those motor shafts rotate or oscillate about the same yaw motor axis indicated as dotted line Y in FIG. 17. As shown in FIG. 17, flap motor axis X and yaw motor axis Y preferably are parallel to each other.

As can be seen in FIG. 17, flap motor axis X does not have the same axis of rotation as that of arcuate guide rails 110 and 110A. Accordingly, some gearing or other means is provided for translating the rotary or oscillating motion of flap motor shafts 190 and 190A about axis X to motion of arcuate guide rails 110 and 110A about their different axes of rotation. In the embodiment shown, this translation is performed by providing bevel gear pairs 195 and 195A.

Similarly, yaw motor axis Y is not the same axis of rotation as that of arcuate guide rails 120 and 120A, so again some gearing or other means is provided for translating the rotary or oscillating motion of flap motor shafts 191 and 191A about axis Y to motion of arcuate guide rails 120 and 120A about their different axes of rotation. In the embodiment shown, this translation is performed by providing bevel gear pairs 196 and 196A.

By aligning flap motor 171 with flap motor 171A and yaw motor 181 with yaw motor 181A in this manner, a significant space savings is achieved relative to the configuration shown in U.S. Pat. Nos. 6,206,324, 6,565,039, 6,568,634, 6,783,097, and 8,181,907. The reduced space requirements can lead directly to a smaller fuselage and/or a greater vehicle payload.

Figure 18:
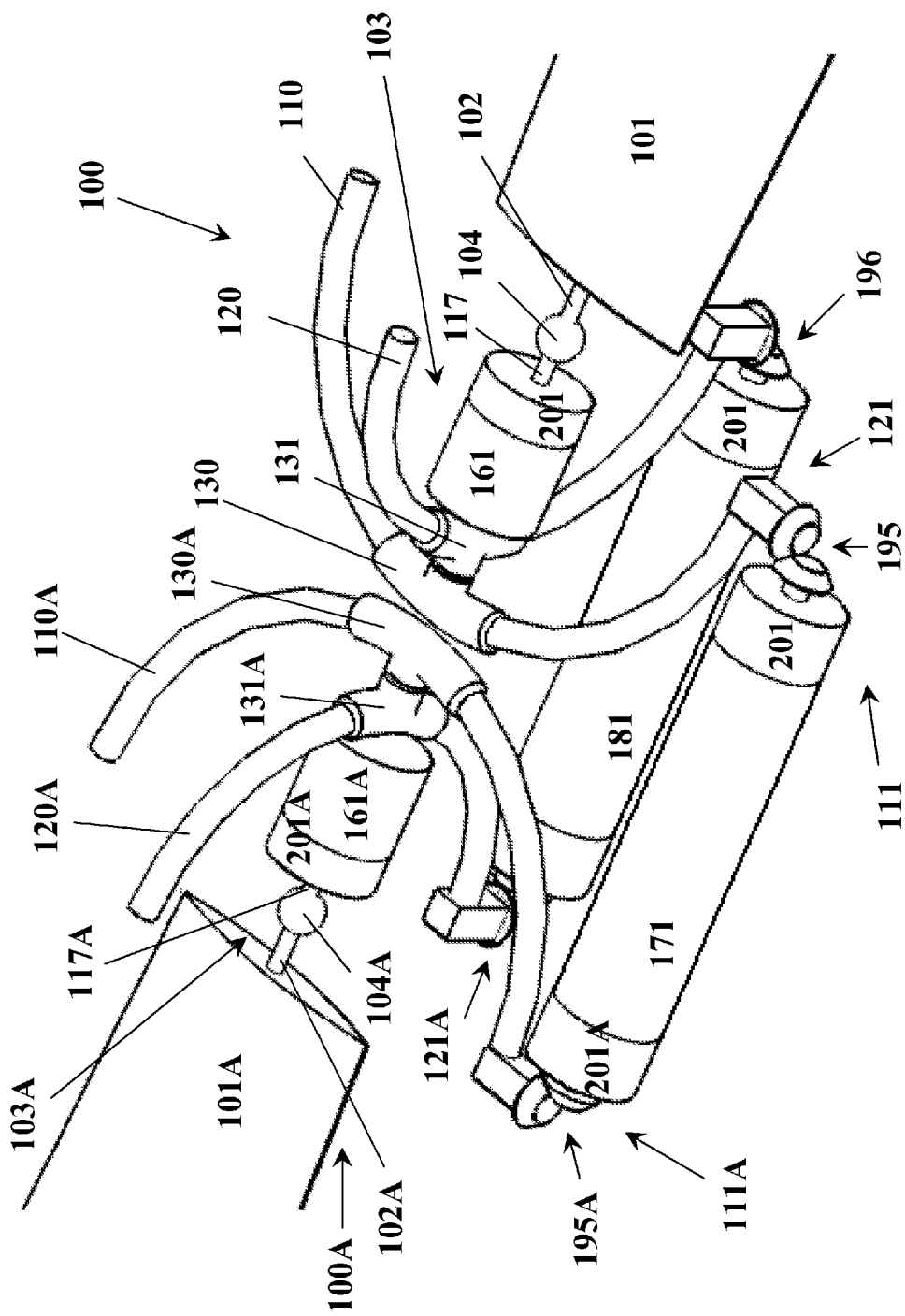
FIG. 18 is a perspective view of a second embodiment of a pair of first and second opposed wing-drive mechanisms of the invention.

The alignment of the flap and yaw motors also creates the possibility of using a single motor to operate both of the flap-drive sub-mechanisms and/or both of the yaw-drive sub-mechanisms. This leads to further benefits in weight and/or space reduction. FIG. 18 illustrates such an embodiment of the invention.

In FIG. 18, reference numerals correspond to similarly numbered features in FIG. 17. In FIG. 18, a single flap-drive motor 171 drives both first flap-drive sub-mechanism 111 and second flap-drive sub-mechanism 111A. Despite the use of a common motor 171, it is still possible to operation first and second flap-drive sub-mechanisms 111 and 111A independently through, for example, separately-operated gearing and clutching mechanisms that independently manage the transfer of rotary or oscillating to the respective arcuate guide rails 110 and 110A.

Similarly, the embodiment shown in FIG. 18 includes a single yaw-drive motor 181 which drives both first yaw-drive sub-mechanism 121 and second flap-drive sub-mechanism 121A. Independent operation of first and second yaw-drive sub-mechanisms 121 and 121A can be achieved in the same manner as just described, though, for example, separately-operated gearing and clutching mechanisms.

The configuration shown in FIG. 18, therefore, reduces the number of required motors from six to four, resulting in a significant weight savings.

Figure 19:
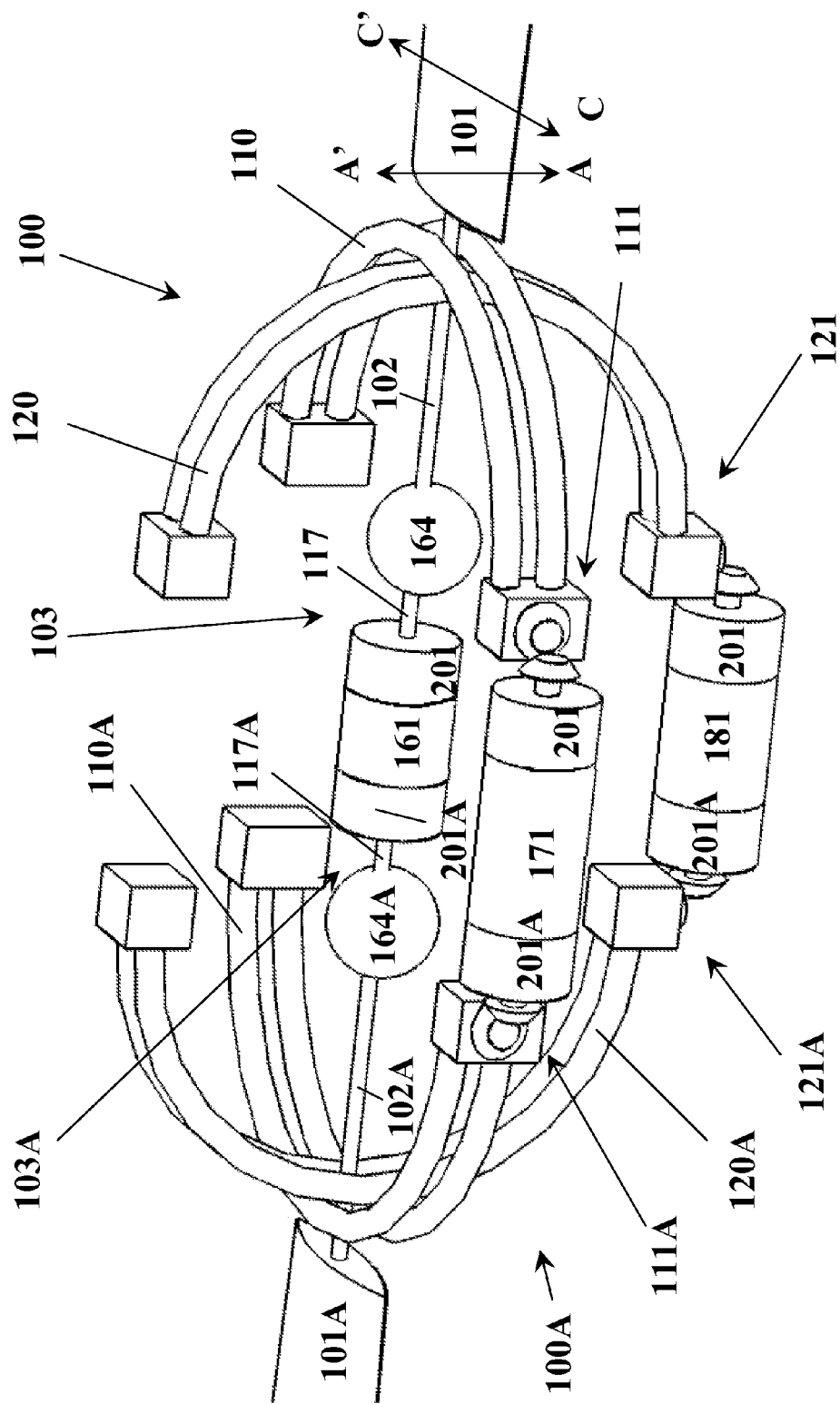
FIG. 19 is a perspective view of a third embodiment of a pair of first and second opposed wing-drive mechanisms of the invention.

A rearrangement of elements of the wing-drive mechanisms creates the possibility of further reducing the number of motors to three. An embodiment of a pair of such rearranged wing-drive mechanisms is shown in FIG. 19. In FIG. 19, reference numerals indicate the same features as similarly numbered features of FIG. 17.

In the embodiment shown in FIG. 19, pitch-drive sub-mechanisms 103 and 103A of wing-drive mechanism 100 and 100A consist of common motor 161 that is affixed to inwardly extending spars 117 and 117A. A pitch motion is imparted to inwardly extending spars 117 and 117A and outwardly extending spars 104 and 104A via the operation of common motor 161.

Inwardly extending spars 117 and 117A are connected to outwardly extending spars 104 and 104A, respectively, through universal joints 164 and 164A.

Flap-drive sub-mechanisms 111 and 111A include, in the embodiment shown, arcuate guide rails 110 and 110A, respectively, which, in the embodiment shown, are dual rails adapted to receive outwardly extending spars 104 and 104A, respectively. If desired, a single rail and sleeve system such as described in FIGS. 17 and 18 would be suitable as well. Upon actuation of motor 171, flap-drive sub-mechanisms 111 and 111A provide torque to outwardly extending spars 104 and 104A via arcuate guide rails 110 and 110A. The effects movement of outwardly extending spars 104 and 104A, resulting in a movement in a flap direction indicated by double-headed arrow A-A'.

Yaw-drive sub-mechanisms 121 and 121A include, in the embodiment shown, arcuate guide rails 120 and 120A, respectively, which, in the embodiment shown, are dual rails adapted to receive outwardly extending spars 104 and 104A, respectively. If desired, a single rail and sleeve system such as described in FIGS. 17 and 18 would be suitable as well. Upon actuation of motor 181, yaw-drive sub-mechanisms 121 and 121A provide torque to outwardly extending spars 104 and 104A via arcuate guide rails 120 and 120A. The effects movement of outwardly extending spars 102 and 102A, resulting in a movement in a yaw direction indicated by double-headed arrow C-C'.

Flap-drive sub-mechanism 111, yaw-drive sub-mechanism 121 and pitch-drive sub-mechanism 103 all operate independently of each other, as do flap-drive sub-mechanism 111A, yaw-drive sub-mechanism 121A and pitch-drive sub-mechanism 103A.

In the embodiment shown in FIG. 19, common motor 171 drives first and second flap-drive sub-mechanisms 111 and 111A, common motor 181 drives first and second yaw-drive sub-mechanisms 121 and 121A, and common motor 161 drives first and second pitch-drive sub-mechanisms 103 and 103A. However, with this configuration, any of these common motors can be replaced with separate motors for each of the respective drive sub-mechanisms. Thus, for example, separate motors can be provided to drive flap-drive sub-mechanisms 111 and 111A, separate motors can be provided to drive yaw-drive sub-mechanisms 121 and 121A, and separate motors can be provided to drive pitch-drive sub-mechanisms 103 and 103A. Therefore, the number of motors may range from three to six for this configuration.

When the flap and/or yaw sub-mechanisms have separate motors, the motor shafts of the respective motors preferably rotate or oscillate about the same flap or yaw motor axis, as described before.

Although FIGS. 17-19 illustrate embodiments having only a single pair of opposing wing-drive mechanisms, the vehicle may of course have any larger number of pairs of wing-drive mechanisms as may be useful or desirable.

In the embodiments shown in FIGS. 17-19, all of the various motors are unidirectional, and a converter unit as described earlier herein is provided in each instance. This is not necessary for this aspect of the invention, and any or all of the various motors may impart oscillating motion to the respective sub-mechanism, in which case the corresponding converter unit 201 or 201A may be omitted.

The various motors described herein are devices that convert a source of energy into rotating or oscillating motion that is imparted directly to the corresponding drive sub-mechanism. In the case of the flap and yaw-drive sub-mechanisms in the various configurations described in FIGS. 17-19, the motor is the device that produces rotary or oscillating motion along the common axis as described before. The source of energy may be, for example, electrical, chemical, electromagnetic, kinetic or other type that is convertible to the desired rotary or oscillating motion. The motors may be, for example, electric motors, internal combustion motors, piezoelectric motors, hydraulic motors or other types.

The various motors, or any subsets thereof, may share a power source. Shared power sources often can reduce overall weight and/or space requirements. In the case of electric or piezoelectric motors, for example, a common electrical source such as one or more batteries, fuel cells, electrical generators or the like can be provided. A common hydraulic system can provide mechanical energy through the flow of a working fluid to two or more of the motors. Similarly, a common internal combustion engine can provide mechanical energy to two or more of the motors, which convert it to the desired rotational or oscillating motion. It is noted in the last case, the motors can be described more generally as transmissions or like devices, as they transmit kinetic energy rather than producing it from another energy source.

The invention claimed is:

1. A wing-drive mechanism comprising independently operable flap, yaw and pitch sub-mechanisms, in which at least one of the sub-mechanisms includes:
   a) a drive shaft rotatable in a single direction and
   b) a conversion unit for producing an alternating rotary motion, wherein the conversion unit includes:
   b-1) converter means for converting the rotary motion of the drive shaft to a linear or arcuate back-and-forth motion;
   b-2) a rotatably mounted output mechanism engaged with the converter means such that when the converter means produces the linear or arcuate back-and-forth motion, a corresponding alternating rotary motion is imparted to the output mechanism and
   b-3) torsion control means engaged with the output mechanism.

2. The wing-drive mechanism of claim 1 wherein the conversion unit further comprises b-4) amplitude control means for controllably varying the extent of the linear or arcuate back-and-forth motion produced by the converter means.

3. The wing-drive mechanism of claim 2, wherein the converter means includes a slider support rod mounted onto and perpendicular to the drive shaft such that the slider support rod rotates with the rotation of the drive shaft; a slider mounted onto and movable along the slider support rod, the slider having an engagement rod extending perpendicularly to the slider support rod and parallel to the drive shaft, and a slotted reciprocator having a slot which receives the engagement rod such that when the drive shaft and slider support rod rotate, the resulting motion of the slider and the engagement rod produce a linear or arcuate back-and-forth motion of the slotted reciprocator.

4. The wing-drive mechanism of claim 3, wherein the slotted reciprocator is slidably mounted and slides in a linear back-and-forth motion in response to the rotation of the slider support rod.

5. The wing-drive mechanism of claim 3, wherein the slotted reciprocator is a pivotably mounted swivel arm which pivots to move one end of the slotted reciprocator in an arcuate back-and-forth motion in response to the rotation of the slider support rod.

6. The wing-drive mechanism of claim 1 wherein the converter means includes a slider support rod mounted onto and perpendicular to the drive shaft such that the slider support rod rotates with the rotation of the drive shaft; a slider mounted onto and movable along the slider support rod, the slider having an engagement rod extending perpendicularly to the slider support rod and parallel to the drive shaft, a first pivotably mounted swivel arm which engages with the engagement rod and moves at one end in an arcuate back-and-forth motion in response to the rotation of the slider support rod, and a second swivel arm pivotably mounted to the first pivotably mounted swivel arm, wherein the first and second swivel arms engage with the rotatably-mounted output mechanism to produce the alternating rotary motion.

7. The wing-drive mechanism of claim 3 wherein the amplitude control means for adjusting the position of the slider on the slider support rod.

8. The wing-drive mechanism of claim 7, wherein the amplitude control means controllably varies the extent of movement of the slider along the slider support rod as the slider support rod rotates with the drive shaft, thereby controlling the amplitude of the linear back-and-forth motion of the slotted reciprocator and the amplitude of the alternating rotary motion of the output mechanism.

9. The wing-drive mechanism of claim 8 wherein the means for adjusting the position of the slider on the slider support rod includes one or more of an iris or a movable end-stop.

10. The wing-drive mechanism of claim 8 wherein the means for adjusting the position of the slider on the slider support rod includes threading on the slider support rod, reciprocal threading on the slider, and a motor for axially rotating the slider support rod such that when the slider support rod is axially rotated, the position of the slider along the slider support rod is changed.

11. The wing-drive mechanism of claim 1 wherein converter means includes a dual spiral slotted gear shaft mounted in a fixed position and rotatable about its longitudinal axis, and a spiral gear follower mounted on the dual spiral slotted gear shaft, the dual spiral slotted gear shaft being engaged with the drive shaft such that the rotation of the drive shaft produces an axial rotation of the drive shaft and a back-and-forth motion of the spiral gear follower along the dual spiral slotted gear shaft.

12. The wing-drive mechanism of claim 11 wherein the spiral gear follower engages with a follower mounted on a follower support rod or pair of follower support rods parallel to the dual spiral slotted gear shaft, the follower having an engagement rod extending perpendicularly to the follower support rod or rods and parallel to the drive shaft, and further wherein said engagement rod engages a rack gear which is engaged with the rotary mounted output mechanism, such that upon rotation of the drive shaft, a linear back-and-forth motion is imparted to the rack gear and an alternating rotary motion is imparted to the output mechanism.

13. The drive wing mechanism of claim 12 wherein the amplitude control means includes one or more moveable stops on the slider support rod.

14. The drive wing mechanism of claim 11, wherein the spiral gear follower engages with a slider mounted on a slider support rod or pair of slider support rods parallel to the dual spiral slotted gear shaft, the slider having an engagement rod extending perpendicularly to the slider support rod and parallel to the drive shaft, and further wherein said engagement rod engages a pulley-and-idler-gear system which is engaged with the rotary mounted output mechanism, such that upon rotation of the drive shaft, a back-and-forth motion is imparted to the pulley-and-idler-gear system and an alternating rotary motion is imparted to the output mechanism.

15. The drive wing mechanism of claim 14 wherein the amplitude control means includes one or more moveable stops on the slider support rod.

16. The wing-drive mechanism of claim 1, wherein the converter means includes a first telescoping shaft mounted onto the drive shaft such that the first telescoping shaft rotates with the drive shaft; a second telescoping shaft pivotably mounted at one end onto the first telescoping shaft and pivotably engaged at the opposing end to a slider, the slider being slidably mounted such that upon rotation of the drive shaft, the slider moves in a linear back-and-forth motion, and the slider engages with the rotatably mounted output mechanism.

17. The wing-drive mechanism of claim 16 wherein the amplitude control means includes means for changing the lengths of the first and second telescoping shafts.

18. The wing-drive mechanism of claim 1, wherein said at least one of the sub-mechanism is a flap-drive sub-mechanism, and a wing spar is engaged with the rotatably mounted output mechanism such that the alternating rotary motion of the output mechanism imparts an up-and-down motion to the wing spar.

19. The wing-drive mechanism of claim 1, wherein said at least one of the sub-mechanism is a yaw-drive sub-mechanism, and a wing spar is engaged with the rotatably mounted output mechanism such that the alternating rotary motion of the output mechanism imparts a yaw motion to the wing spar.

20. A vehicle having a fuselage and a pair of opposing first and second wing-drive mechanisms on opposing sides of said fuselage, wherein each of said opposing first and second wing-drive mechanisms includes
 a) an outwardly extending spar that is moveable independently in flap, yaw and pitch directions about a pivot point;
 b) an inwardly extending spar that is movable independently in flap, yaw and pitch directions about the pivot point;
 c) a flap-drive sub-mechanism for moving said outwardly extending spar about the pivot point in a flap direction, said flap-drive sub-mechanism including a motor shaft;
 d) a yaw-drive sub-mechanism for moving said outwardly extending spar about the pivot point in a yaw direction, said yaw-drive sub-mechanism including a rotating or oscillating motor shaft and wherein said yaw-drive sub-mechanism operates independently of said flap-drive sub-mechanism;
 e) a pitch-drive sub-mechanism for moving said outwardly extending spar about the pivot point in a pitch direction, wherein said pitch-drive sub-mechanism operates independently of said flap-drive and yaw-drive sub-mechanisms;
and further wherein
 f) the motor shaft of the flap-drive sub-mechanism of said first wing-drive mechanism and the motor shaft of the flap-drive sub-mechanism of said second wing-drive mechanism rotate or oscillate about the same flap motor axis and
 g) the motor shaft of the yaw-drive sub-mechanism of said first wing-drive mechanism and the motor shaft of the yaw-drive sub-mechanism of said second wing-drive mechanism rotate or oscillate about the same yaw motor axis.

\* \* \* \* \*